(12) United States Patent
Sugimoto et al.

(10) Patent No.: US 10,808,813 B2
(45) Date of Patent: Oct. 20, 2020

(54) TRANSAXLE AND MOTOR UNIT FOR HYBRID VEHICLE

(71) Applicant: KANZAKI KOKYUKOKI MFG. CO., LTD., Amagasaki-shi, Hyogo (JP)

(72) Inventors: Hiroshi Sugimoto, Amagasaki (JP); Yoshitaka Kochidomari, Amagasaki (JP); Hongkun Wang, Amagasaki (JP); Fumiaki Ito, Amagasaki (JP)

(73) Assignee: KANZAKI KOKYUKOKI MFG. CO., LTD., Amagasaki-Shi, Hyogo (JP)

( * ) Notice: Subject to any disclaimer, the term of this patent is extended or adjusted under 35 U.S.C. 154(b) by 867 days.

(21) Appl. No.: 15/341,452

(22) Filed: Nov. 2, 2016

(65) Prior Publication Data

US 2017/0120899 A1    May 4, 2017

(30) Foreign Application Priority Data

Nov. 4, 2015   (JP) .................................. 2015-217151

(51) Int. Cl.
*F16H 37/02* (2006.01)
*B60K 6/36* (2007.10)
(Continued)

(52) U.S. Cl.
CPC ............. *F16H 37/021* (2013.01); *B60K 6/36* (2013.01); *B60K 6/387* (2013.01); *B60K 6/40* (2013.01);
(Continued)

(58) Field of Classification Search
None
See application file for complete search history.

(56) References Cited

U.S. PATENT DOCUMENTS 7,867,132 B2   1/2011  Ishii et al.
8,534,257 B2   9/2013  Ogi et al.
(Continued)

FOREIGN PATENT DOCUMENTS

JP    2001027264 A    1/2001
JP    2008126702 A    6/2008
(Continued)

OTHER PUBLICATIONS

JPO Notification of Reasons for Refusal corresponding to JP Application No. 2015-217151; dated Jun. 18, 2019.

*Primary Examiner* — Colby M Hansen
(74) *Attorney, Agent, or Firm* — Cantor Colburn LLP

(57) ABSTRACT

A transaxle may include a motor, an input shaft, first and second output shafts, and first and second clutches. The input shaft has first and second ends. The first end of the input shaft is structured to receive an engine power from an engine. The second end of the input shaft is structured to receive motor power from the motor. The first output shaft is driven by power outputted from the input shaft. The second output shaft is driven by the motor power. The second output shaft is extended coaxially to the input shaft. The first clutch is interposed between the motor and the input shaft. The second clutch is interposed between the motor and the second output shaft. The first clutch and the second clutch are coaxially disposed between the second end of the input shaft and an axial end of the second output shaft.

17 Claims, 19 Drawing Sheets

(51) Int. Cl.
    *B60K 6/48* (2007.10)
    *B60W 10/02* (2006.01)
    *B60K 6/52* (2007.10)
    *B60K 6/40* (2007.10)
    *B60K 6/405* (2007.10)
    *B60K 6/543* (2007.10)
    *B60K 6/387* (2007.10)
    *B60W 10/06* (2006.01)
    *B60W 10/08* (2006.01)

(52) U.S. Cl.
    CPC ............ *B60K 6/405* (2013.01); *B60K 6/48* (2013.01); *B60K 6/52* (2013.01); *B60K 6/543* (2013.01); *B60K 2006/4808* (2013.01); *B60K 2006/4816* (2013.01); *B60K 2006/4825* (2013.01); *B60K 2006/4833* (2013.01); *B60W 10/02* (2013.01); *B60W 10/06* (2013.01); *B60W 10/08* (2013.01); *B60W 2710/021* (2013.01); *B60Y 2200/92* (2013.01); *B60Y 2300/42* (2013.01); *B60Y 2300/43* (2013.01); *B60Y 2400/82* (2013.01); *F16H 2037/026* (2013.01); *Y02T 10/626* (2013.01); *Y02T 10/6221* (2013.01); *Y02T 10/6256* (2013.01); *Y02T 10/6265* (2013.01); *Y02T 10/6286* (2013.01); *Y10S 903/909* (2013.01); *Y10S 903/916* (2013.01); *Y10S 903/93* (2013.01); *Y10S 903/946* (2013.01)

(56) References Cited

U.S. PATENT DOCUMENTS

| | | |
|---|---|---|
| 2008/0234092 A1 | 9/2008 | Ishii et al. |
| 2011/0155093 A1 | 6/2011 | Ogi et al. |
| 2012/0234135 A1 | 9/2012 | Oki |
| 2014/0113766 A1 | 4/2014 | Yagyu et al. |
| 2016/0052382 A1* | 2/2016 | Clark ............... B60K 6/26 477/5 |
| 2018/0215249 A1* | 8/2018 | Duan ............... F16H 57/0489 |

FOREIGN PATENT DOCUMENTS

| | | |
|---|---|---|
| JP | 2008232306 A | 10/2008 |
| JP | 2010261544 A | 11/2010 |
| JP | 2011132937 A | 7/2011 |
| JP | 2012192856 A | 10/2012 |
| JP | 2014083869 A | 5/2014 |
| JP | 2014133489 A | 7/2014 |
| JP | 2015000679 A | 1/2015 |

* cited by examiner

| | Driven Wheel | Drive Source | | Clutch | |
|---|---|---|---|---|---|
| | | E | M | C1 | C2 |
| AWD Mode | F and R | ON | ON | OFF | ON |
| EV Mode | F | OFF | ON | OFF | ON |
| Assist Mode | R | ON | ON | ON | OFF |
| 1st Regeneration Mode | R | ON | OFF | ON | OFF |
| 2nd Regeneration Mode | R | ON | OFF | OFF | ON |

TRANSAXLE AND MOTOR UNIT FOR HYBRID VEHICLE

CROSS-REFERENCE TO RELATED APPLICATIONS

The present application claims priority under Paris Convention based on Japanese Patent Application No. 2015-217151, filed on Nov. 4, 2015, the contents of which are hereby incorporated by reference.

BACKGROUND

Field of the Invention

At least one embodiment of the present invention relates to a transaxle for a hybrid vehicle, and a motor unit adaptable to the transaxle.

There is a well-known conventional utility vehicle (hereinafter referred to as "UTV") equipped with an engine, a rear transaxle carrying rear drive wheels and incorporating a gear transmission, and a continuously variable belt transmission (hereinafter, referred to as "CVT") interposed between an engine output shaft of the engine and an input shaft of the rear transaxle. The UTV includes a front transaxle carrying front drive wheels, and the rear transaxle includes a power take-off (hereinafter, referred to as "PTO") shaft for transmitting power outputted from the CVT to the front transaxle.

The UTV must have a high axle-driving torque to ensure a good run-through performance on wildernesses, uneven grounds, muddy places, and so on. On the contrary, it is desired to save fuel consumption for driving the engine. Further, if the UTV is used for hunting, the UTV is required to go slow and silent to approach a quarry. However, a rotary speed of the engine must increase to some degree to realize a low speed stage of the CVT, so that it is hard for the UTV to be silent during its slow traveling.

Therefore, as disclosed by JP 2014-133489 A (hereinafter, referred to as "D1"), some kinds of UTVs have been developed as hybrid UTV, each of which has a motor that outputs a motor power for assisting an engine power from the engine.

However, in the hybrid UTV of D1, the motor is assembled with the CVT. Similarly, each of hybrid vehicle transmission systems disclosed by JP 2014-083869 A (hereinafter referred to as "D2") and JP 2015-000679 A (hereinafter referred to as "D3") includes a CVT assembled with a motor.

Each of the CVTs disclosed by D1, D2 and D3 includes an input pulley provided on a motor output shaft of the motor. An engine output shaft is disposed coaxially to the motor output shaft, and is provided thereon with a centrifugal clutch or a one way clutch through which an engine power is transmitted to the input pulley. Therefore, the CVT, especially, the input pulley and its surroundings, must be complicated and expanded. Such a complicated and expanded CVT with a motor causes a laborious work of installing the CVT with the motor in association with an engine, strictly limits a position of the CVT and the motor in the vehicle, and increases costs for manufacturing the hybrid vehicle.

SUMMARY

In at least a first embodiment of the invention, a transaxle for a hybrid vehicle comprises a motor, an input shaft, first and second output shafts, and first and second clutches. The motor is configured to output a motor power. The input shaft has first and second ends axially opposite each other. The first end of the input shaft is structured to receive an engine power from an engine of the hybrid vehicle. The second end of the input shaft is structured to receive the motor power from the motor. The first output shaft is driven by power outputted from the input shaft so as to drive a first drive wheel of the hybrid vehicle. The second output shaft is driven by the motor power from the motor so as to drive a second drive wheel of the hybrid vehicle. The second output shaft is extended coaxially to the input shaft. The first clutch is interposed between the motor and the input shaft. The second clutch is interposed between the motor and the second output shaft. The first clutch and the second clutch are coaxially disposed between the second end of the input shaft and an axial end of the second output shaft.

Therefore, even if the hybrid vehicle includes a transmission, such as a CVT, interposed between the engine and the input shaft of the transaxle, the transmission can be simplified and minimized because the transaxle includes the motor.

In a first aspect of the transaxle, the motor comprises a motor shaft serving as a rotary axis of the motor. The motor shaft is axially offset from the input shaft and the second output shaft. The transaxle further comprises a drive train interposed between the motor shaft and the first and second clutches. The drive train comprises a power distribution member disposed between the first and second clutches. The first clutch is interposed between the second end of the input shaft and the power distribution member. The second clutch is interposed between the power distribution member of the second output shaft.

Therefore, due to the axial offset of the motor from the first and second clutches, the whole length of the transaxle in the axial direction of the input shaft and the second output shaft can be reduced, thereby minimizing the hybrid vehicle in this direction, or expanding a free space in the hybrid vehicle sideward from the transaxle in this direction. Further, due to the power distribution member that distributes the motor power between the first and second clutches, the transaxle needs no additional drive train to drivingly connect the motor shaft to both the first and second clutches, thereby reducing the number of component parts and costs.

Alternatively, in a second aspect of the transaxle, the motor comprises a motor shaft serving as a rotary axis of the motor. The motor shaft comprises axially opposite end portions serving as first and second motor output end portions for outputting the motor power. The motor is disposed between the first and second clutches so that the motor shaft is extended coaxially to the input shaft and the second output shaft. The first clutch is interposed between the second end of the input shaft and the first motor output end portion of the motor shaft. The second clutch is interposed between the second motor output end portion of the motor shaft and the axial end of the second output shaft.

Therefore, due to the coaxial arrangement of the motor between the first and second clutches, a portion of the transaxle incorporating the motor and the first and second clutches is minimized in the radial direction with respect to the axial line of the input shaft and the second output shaft, thereby expanding a free space for arranging various implements around the portion of the transaxle incorporating the motor and the first and second clutches. Further, the transaxle needs no additional component member for constituting a drive train, such as a gear train, drivingly connecting the motor to the first and second clutches, thereby reducing the number of component members of the transaxle and reducing costs.

In a third aspect of the transaxle, the transaxle comprises a transmission interposed between the input shaft and the first output shaft, and a transaxle casing comprising first and second housings. The first housing incorporates the input shaft, the transmission and the first output shaft. The motor and the first and second clutches are assembled as a motor-and-clutch assembly. The second housing incorporates the entire motor-and-clutch assembly and the second output shaft, so that the second housing, the motor-and-clutch assembly, and the second output shaft are assembled as a motor unit. The transaxle comprising the motor unit is configured such that the motor unit is detachable from the first housing of the transaxle casing by detaching the second housing from the first housing and by separating the first clutch from the input shaft in the first housing.

Therefore, the motor unit including the motor-and-clutch assembly can be easily detached from the transaxle only by detaching the second housing from the first housing without requiring disassembling the motor-and-clutch assembly, thereby facilitating maintenance of the motor-and-clutch assembly in the second housing, and the transmission in the first housing.

In the third aspect of the transaxle, the motor comprises a motor shaft axially offset from the second output shaft. The motor-and-clutch assembly comprises a drive train interposed between the motor shaft and the first and second clutches so as to transmit the motor power from the motor to the first and second clutches.

Therefore, the motor unit of the transaxle has the above-mentioned effects due to the axial offset of the motor from the first and second clutches.

Alternatively, in the third aspect of the transaxle, in the motor-and-clutch assembly, the motor is disposed between the first and second clutches. The motor comprises a motor shaft disposed coaxially to the second output shaft. The motor shaft has axially opposite ends drivingly connected to the first and second clutches, respectively.

Therefore, the motor unit of the transaxle has the above-mentioned effects due to the coaxial arrangement of the motor between the first and second clutches.

In a fourth aspect of the transaxle, the motor and the first and second clutches are operatively connected to a controller and a drive mode selection device provided in the hybrid vehicle. The controller is configured such that, when a drive mode for the hybrid vehicle is selected by the drive mode selection device, the controller controls on/off operation of the engine in the hydraulic vehicle and the motor in the transaxle and engagement/disengagement operation of the first and second clutches in the transaxle so as to realize the selected drive mode.

Therefore, the hybrid vehicle can travel in an optimal drive mode corresponding to respective requirements, such as high-power travel performance, economic travel, smooth starting acceleration, and the like.

In the fourth aspect of the transaxle, the controller is configured such that the engine and the motor are turned on, the first clutch is disengaged, and the second clutch is engaged, when the selected drive mode is to make the hybrid vehicle travel with the first drive wheel driven by the engine power from the engine and with the second drive wheel driven by the motor power from the motor.

Therefore, the hybrid vehicle can travel off-road with high power, i.e., the engine power driving the first drive wheel and the motor power driving the second drive wheel, over wildernesses, uneven grounds, muddy places, etc.

In the fourth aspect of the transaxle, the controller is configured such that the engine is turned off, the motor is turned on, the first clutch is disengaged, and the second clutch is engaged, when the selected drive mode is to make the hybrid vehicle travel with the second drive wheel driven by the motor power from the motor.

Therefore, the hybrid vehicle can travel as an electric vehicle such as to enable a silent and slow travel performance appropriate for hunting or any other uses, and such as to reduce fuel consumption for driving the engine.

In the fourth aspect of the transaxle, the controller is configured such that the engine and the motor are turned on, the first clutch is engaged, and the second clutch is disengaged, when the selected drive mode is to make the hybrid vehicle travel with the first drive wheel driven by the engine power from the engine and the motor power from the motor.

Therefore, the hybrid vehicle can travel by the driving power of the first drive wheel concentratedly receiving both the engine power and the motor power, thereby performing a high-power traction or a smooth starting acceleration.

In the fourth aspect of the transaxle, the controller is configured such that the engine is turned on, the motor is turned off, the first clutch is engaged, and the second clutch is disengaged, when the selected drive mode is to make the hybrid vehicle travel with the first drive wheel driven by the engine power from the engine while the motor is rotated by the engine power to generate electric power.

Therefore, the hybrid vehicle can automatically recover the capacity of a battery for reserving electric power for driving the motor during its travel with the first drive wheel driven by the engine power.

In the fourth aspect of the transaxle, the controller is configured such that the engine is turned on, the motor is turned off, the first clutch is disengaged, and the second clutch is engaged, when the selected drive mode is to make the hybrid vehicle travel with the first drive wheel driven by the engine power from the engine while the motor is rotated by a rotary force of the second drive wheel to generate electric power.

Therefore, the conversion of the rotary force of the second drive wheel to electric power by the motor functions as a regeneration brake applied to the second drive wheel so as to prevent the hybrid vehicle descending a slope (for example) from being unexpectedly accelerated.

In at least a second embodiment of the invention, a motor unit comprises a motor, first and second drive members, first and second clutches, and a power distribution member. The motor is configured to output a motor power. The first and second drive members are coaxial to each other. The first and second clutches are disposed between the first and second drive member. The power distribution member is disposed between the first and second clutches so as to be driven by the motor power. The first clutch is interposed between the first drive member and the power distribution member. The second clutch is interposed between the second drive member and the power distribution member.

Therefore, the motor unit having the first and second drive members is adaptable to a hybrid vehicle so that the first drive member serves as an input shaft of a transaxle carrying a first drive wheel, such as rear wheels, of the vehicle and driven by an engine, and the second drive member serves as a drive shaft for transmitting the motor power from the motor to a second drive wheel, such as front wheels, of the vehicle.

In a first aspect of the motor unit, the motor, the power distribution member and the first and second clutches are assembled as a motor-and-clutch assembly. The motor unit further comprises a housing incorporating the entire motor-and-clutch assembly.

Therefore, the motor unit including the motor-and-clutch assembly can be easily handled as a unit which does not require disassembling the motor-and-clutch assembly. If the housing is detachably attachable to a transaxle housing incorporating a transmission driven by an engine, a transaxle including the transaxle housing can be easily adapted as a transaxle for a hybrid vehicle only by attaching the housing of the motor unit to the transaxle housing.

In a second aspect of the motor unit, the motor comprises a motor shaft serving as a rotary axis of the motor. The motor shaft is axially offset from the first and second drive members. The motor unit comprises a drive train interposed between the motor shaft and the first and second clutches. The drive train comprises the power distribution member disposed between the first and second clutches.

Therefore, the whole length of the motor unit in the axial direction of the first and second drive members can be reduced, thereby minimizing a vehicle equipped with the motor unit, or expanding a free space in the vehicle sideward from the motor unit in the axial direction of the first and second drive members.

In the second aspect of the motor unit, the motor, the drive train and the first and second clutches are assembled as a motor-and-clutch assembly. The motor unit comprises a housing incorporating the entire motor-and-clutch assembly.

Therefore, the motor unit including the drive train has the above-mentioned effects of the motor unit including the housing incorporating the motor-and-clutch assembly, in addition to the above-mentioned effect of the axial offset of the motor from the first and second drive members via the drive train.

In a third aspect of the motor unit, the motor comprises a motor shaft serving as a rotary axis of the motor. The motor is disposed between the first and second clutches so that the motor shaft is disposed coaxially to the first and second drive members so as to serve as the power distribution member.

Therefore, due to the coaxial arrangement of the motor between the first and second clutches, the motor unit is minimized in the radial direction with respect to the axial line of the first and second drive members, thereby expanding a free space for arranging various implements around the motor unit. Further, the motor unit needs no additional component member for constituting a drive train for drivingly connecting the motor to the first and second clutches, thereby reducing the number of component members of the motor unit and reducing costs.

In the third aspect of the motor unit, the motor and the first and second clutches are assembled as a motor-and-clutch assembly. The motor unit further comprises a housing incorporating the entire motor-and-clutch assembly.

Therefore, the motor unit in which the motor has the motor shaft coaxial to the first and second drive members has the above-mentioned effect of the motor unit including the housing incorporating the motor-and-clutch assembly, in addition to the above-mentioned clutch of the coaxial arrangement of the motor between the first and second clutches.

These and other features and advantages of the invention will appear more fully from the following detailed description of embodiments of the invention with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
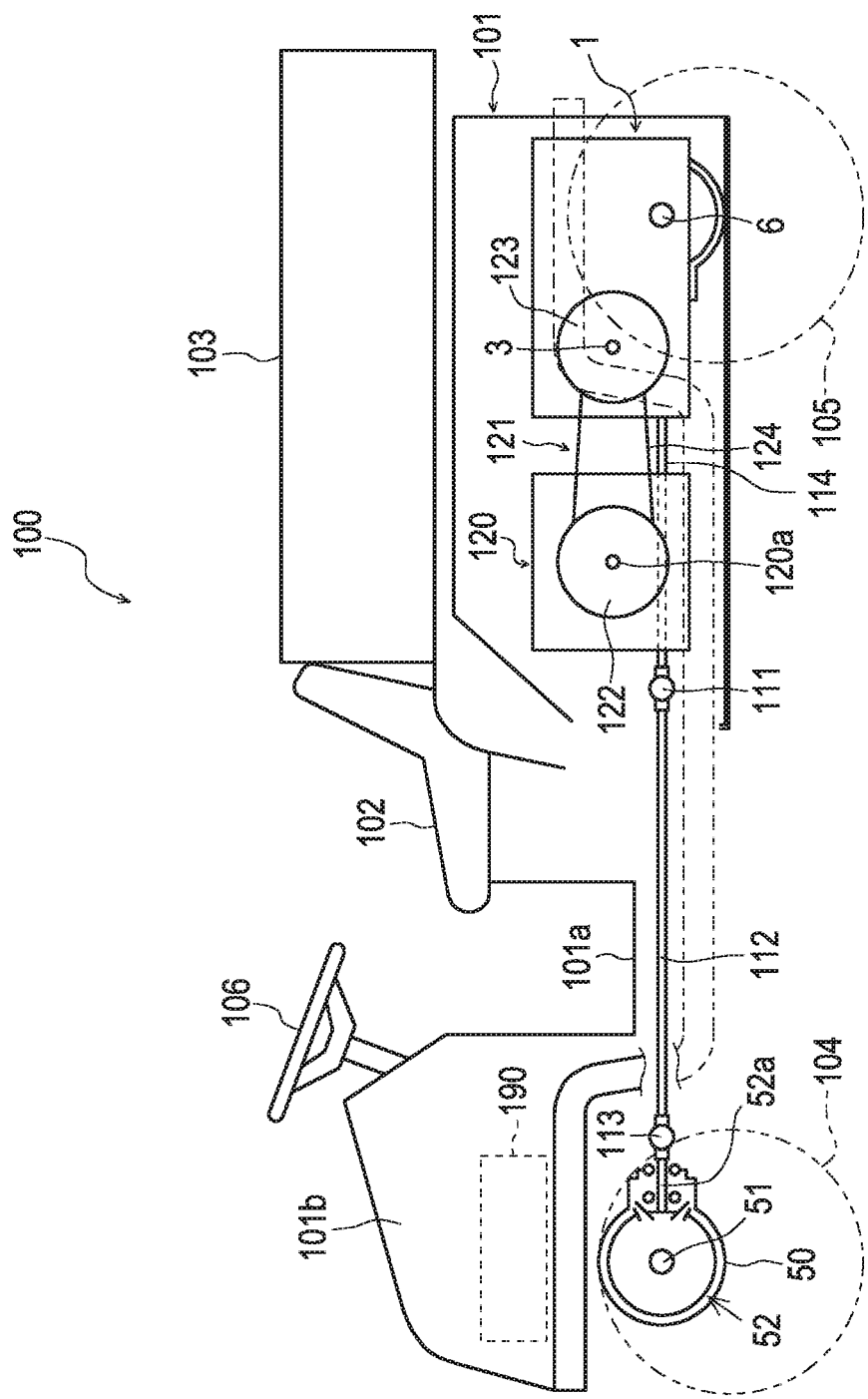
FIG. 1 is a schematic side view of a hybrid vehicle equipped with a transaxle according to a first embodiment.
Figure 2:
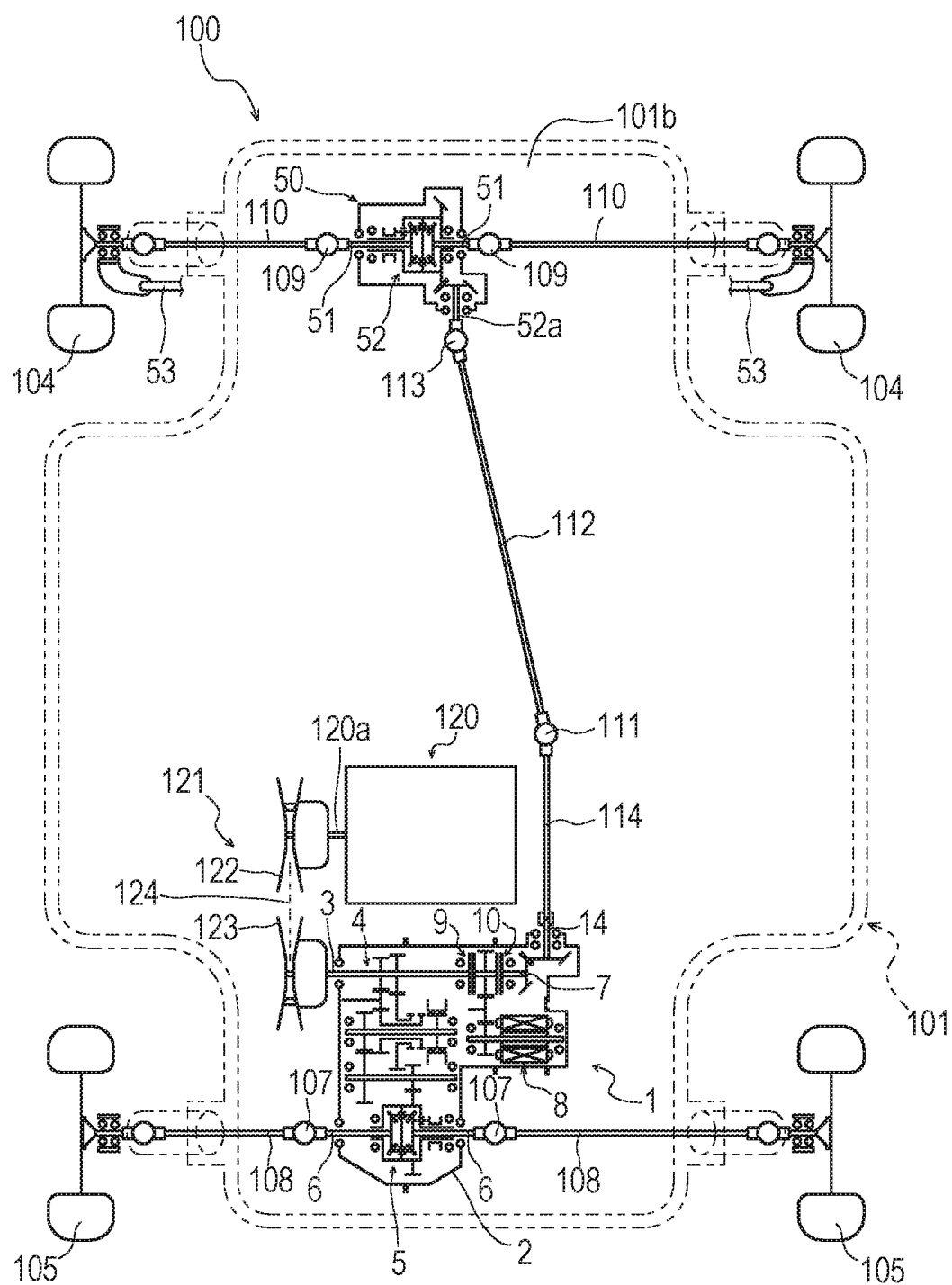
FIG. 2 is a schematic plan view of the hybrid vehicle equipped with the transaxle according to the first embodiment.

Referring to FIGS. 1 and 2, a utility vehicle (UTV) 100 will be described. UTV 100 includes a vehicle body frame 101 extended between front and rear ends of UTV 100.

Vehicle body frame 101 is provided on a fore-and-aft intermediate portion thereof with a platform 101*a*, and on a front portion thereof with a front cover 101*b*. A rear portion of vehicle body frame 101 extended rearward from platform 101*a* is stepped to become higher than platform 101*a*. The rear portion of vehicle body frame 101 is provided on a front end thereof with seats 102, including a driver's seat 102, and is provided thereon with a cargo bed 103 in rear of sears 102.

Right and left front wheels 104 are suspended from the front portion of vehicle body frame 101, and right and left rear wheels 105 are suspended from the rear portion of vehicle body frame 101. A steering wheel 106 for steering front wheels 104 is disposed at an upper portion of front cover 101*b*.

An engine 120 is supported via elastic vibro-isolating rubber by vehicle body frame 101 below cargo bed 103. Engine 120 has a lateral horizontal engine output shaft 120*a*. A front portion of an automatic continuously variable belt transmission (hereinafter referred to as "CVT") 121 is disposed laterally sideward (in this embodiment, leftward) from engine 120 and is drivingly connected to engine output shaft 120*a* so as to serve as a main transmission.

CVT 121 includes an input pulley 122, an output pulley 123, and a V-belt 124.

Input pulley 122 is fixed to engine output shaft 120*a*. Output pulley 123 is fixed to an input shaft 3 of a reverser gear transmission 4 in a rear transaxle casing 2. V-belt 124 is looped over input pulley 122 and output pulley 123.

Each of input and output pulleys 122 and 123 is a dividable pulley whose belt groove has a variable width depending on change of a rotary speed of engine output shaft 120*a*. Therefore, effective diameters of input and output pulleys 122 and 123 having V-belt 124 looped thereon are changed according to change of the rotary speed of engine output shaft 120*a*, so as to change a speed ratio of CVT 121 between engine output shaft 120*a* and input shaft 3.

A transaxle 1 is disposed rearward from engine 120 and laterally sideward (in this embodiment, rightward) from a rear portion of CVT 121. In other words, CVT 121 is disposed laterally sideward (in this embodiment, leftward) from engine 120 and transaxle 1 juxtaposed front and rear.

Figure 3:
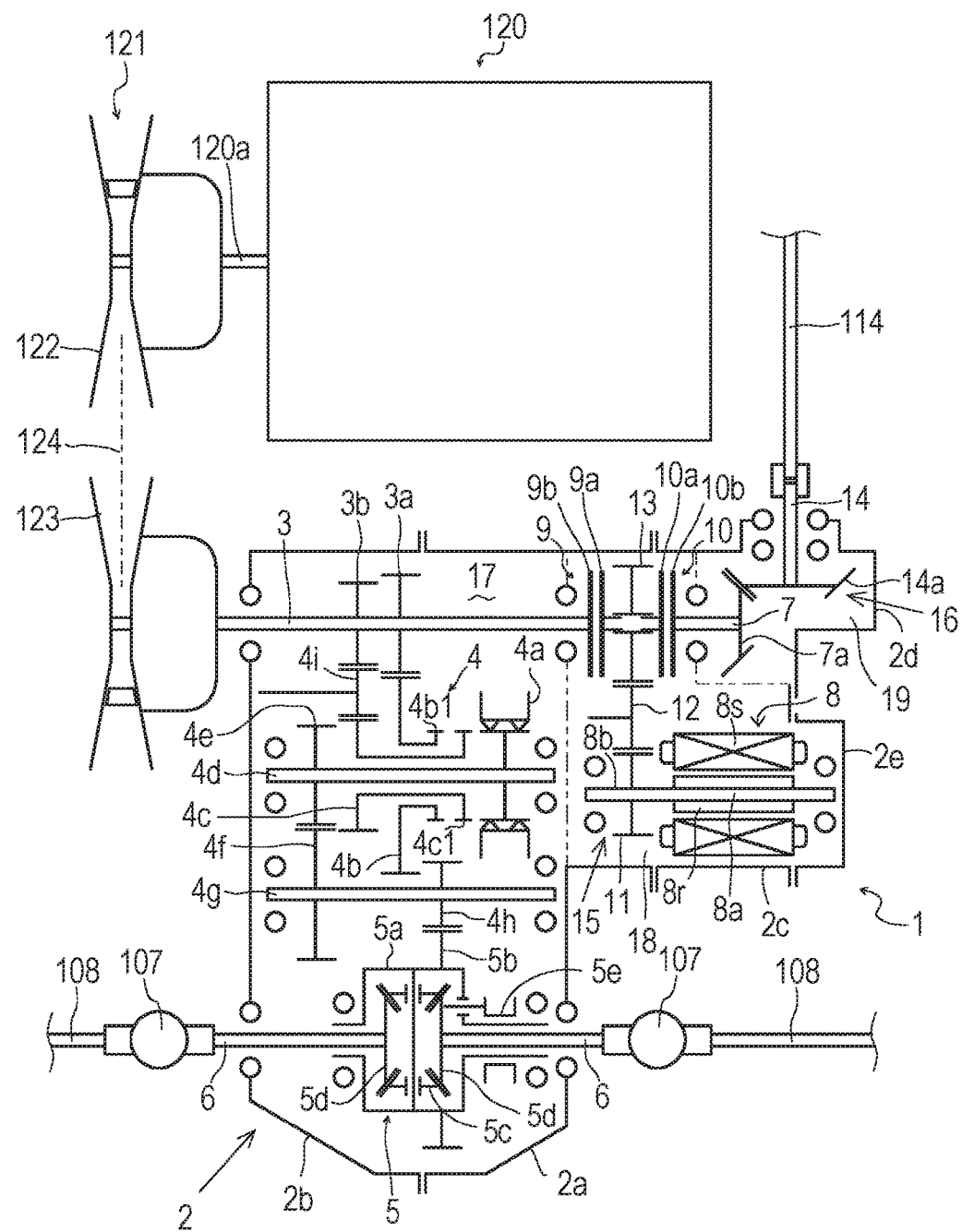
FIG. 3 is a skeleton diagram of a hybrid vehicle driving system including the transaxle according to the first embodiment.

Transaxle 1 includes a rear transaxle casing 2, input shaft 3, reverser gear transmission 4, a differential gear unit 5, a pair of right and left first output shafts 6 serving as right and left rear wheel driving output shafts, a second output shaft 7 serving as a front wheel driving output shaft, an electric motor 8, a first clutch 9 and a second clutch 10 (see FIG. 3).

Rear transaxle casing 2 incorporates reverser gear transmission 4, motor 8, first clutch 9 and second clutch 10. Rear transaxle casing 2 is supported via vibro-isolating rubber by vehicle body frame 101. A power take-off (hereinafter referred to as "PTO") shaft 14 is drivingly connected to second output shaft 7 in rear transaxle casing 2, and projects forward from rear transaxle casing 2 so as to transmit power to front wheels 104.

UTV 100 is provided with a battery 190 serving as a power source for motor 8. Battery 190 is disposed inside of front cover 101*b* on the front portion of vehicle body frame 101 so as to balance UTV 100 in weight with engine 120 and transaxle 1 disposed at the rear portion of UTV 100.

Therefore, UTV 100 having the center of gravity located at the fore-and-aft middle portion thereof can escape from mud easily even if rear wheel 105 is (or rear wheels 105 are) stuck in the mud. In this regard, if battery 190 were also disposed at the rear portion of UTV 100, UTV 100 would have its center of gravity biased rearward to the rear portion of UTV 100, so that it would be hard for UTV 100 to escape from mud when rear wheel 105 were stuck in the mud.

Right and left first output shafts 6 are differentially connected at proximal ends thereof to each other via differential gear unit 5 in rear transaxle casing 2, and project at distal ends thereof rightward and leftward from rear transaxle casing 2 so as to be drivingly connected to respective rear wheels 105 via respective universal joints 107 and propeller shafts 108.

A front transaxle casing 50 is supported by the front portion of vehicle body frame 101 below front cover 101*b*. Front transaxle casing 50 incorporates a differential gear unit 52. Right and left front differential output shafts 51 are journalled by right and left end portions of front transaxle casing 50, are differentially connected at proximal ends thereof to each other via differential gear unit 51 in front transaxle casing 50, and project at distal ends thereof rightward and leftward from the right and left end portions of front transaxle casing 50 so as to be drivingly connected to respective front wheels 104 via respective universal joints 109 and propeller shafts 110.

Right and left front wheels 104 have respective axles connected to each other via a tie rod 53. Tie rod 53 is operatively connected to steering wheel 106. Therefore, during rotation of steering wheel 106, tie rod 53 is moved rightward or leftward so as to rotate both of right and left front wheels 104 rightward or leftward, thereby turning UTV 100 rightward or leftward.

A horizontal input shaft 52*a* of differential gear unit 52 projects rearward from front transaxle casing 50. On the other hand, as mentioned above, PTO shaft 14 projects forward from rear transaxle casing 2, and a propeller shaft 114 is extended coaxially forward from PTO shaft 14 rotatably integrally with PTO shaft 14. Propeller shaft 114 is drivingly connected to input shaft 52*a* via a universal joint 111, a propeller shaft 112 and a universal joint 113.

UTV 100 serves as a typical four-wheel driving hybrid vehicle, and transaxle 1 serving as a rear transaxle of UTV 100 is configured to work well for a four-wheel driving hybrid vehicle. Transaxle 1 will be described in detail with reference to FIGS. 3 to 5, on an assumption that CVT 121 is disposed leftward from transaxle 1.

Rear transaxle casing 2 includes a main housing 2*a*, a gear housing 2*b*, a motor housing 2*c*, a PTO housing 2*d* and a motor cover 2*e*.

Gear housing 2*b* is disposed between CVT 121 and main housing 2*a*. A left portion of main housing 2*a* and gear housing 2*b* are joined to each other so as to define a rear wheel driving gear chamber 17, in which reverser gear transmission 4 and differential gear unit 5 are disposed.

Motor housing 2*c* is disposed opposite gear housing 2*b* with respect to main housing 2*a*. A right portion of main housing 2*a* and motor housing 2*c* are joined to each other so as to define a motor-and-clutch chamber 18, in which motor 8 and first and second clutches 9 and 10 are disposed. Further, a right portion of motor housing 2*c* and PTO housing 2*d* are joined to each other so as to define a front wheel driving gear chamber 19, in which a later-discussed front wheel driving gear train 16 is disposed.

Reverser gear transmission 4 in rear wheel driving gear chamber 17 in rear transaxle casing 2 serves as a transmission for driving rear wheels 105 via differential gear unit 5 and right and left first output shafts 6.

Reverser gear transmission 4 includes input shaft 3, a gearshift shaft 4*d*, and a final pinion shaft 4*g*, which are extended parallel to one another and to first output shafts 6. Reverser gear transmission 4 includes a forward travel gear train and a reverse travel gear train interposed between input shaft 3 and gearshift shaft 4*d*, and includes a speed reduction gear train interposed between gearshift shaft 4*d* and differential gear unit 5 via final pinion shaft 4*g*.

In rear wheel driving gear chamber 17, a forward travel driving gear 3a and a reverse travel driving gear 3b are formed (or fixed) on input shaft 3.

A reverse travel driven gear 4c is fitted on gearshift shaft 4d rotatably relative to gearshift shaft 4d, and meshes with reverse travel driving gear 3b via an idle gear 4i, so that reverse travel driving gear 3b, idle gear 4i and reverse travel driven gear 4c constitute the reverse travel gear train interposed between input shaft 3 and gearshift shaft 4d.

A forward travel driven gear 4b is fitted on reverse travel driven gear 4b rotatably relative to reverse travel driven gear 4b and gearshift shaft 4d, and directly meshes with forward travel driving gear 3a, so that forward travel driving gear 3a and forward travel driven gear 4b constitute the forward travel gear train interposed between input shaft 3 and gearshift shaft 4d.

In rear wheel driving gear chamber 17, a shifter 4a is fitted on gearshift shaft 4d so that shifter 4a is axially slidable along gearshift shaft 4d and is unrotatable relative to gearshift shaft 4d.

Forward travel driven gear 4b is formed with clutch teeth 4b1, and reverse travel driven gear 4c is formed with clutch teeth 4c1. Shifter 4a is formed with clutch teeth that can mesh with clutch teeth 4b1, and with clutch teeth that can mesh with clutch teeth 4c1. Shifter 4a slides along gearshift shaft 4d so as to be selectively disposed at one of three positions consisting of a forward travel position, a reverse travel position, and a neutral position.

When shifter 4a is disposed at the forward travel position, shifter 4a meshes with clutch teeth 4b1 and is separated from clutch teeth 4c1, so that input shaft 3 is drivingly connected to gearshift shaft 4d via the forward travel gear train including gears 3a and 4b.

When shifter 4a is disposed at the reverse travel position, shifter 4a meshes with clutch teeth 4c1 and is separated from clutch teeth 4b1, so that input shaft 3 is drivingly connected to gearshift shaft 4d via the reverse travel gear train including gears 3b, 4i and 4c.

When shifter 4a is disposed at the neutral position, shifter 4a meshes with neither clutch teeth 4b1 nor clutch teeth 4c1, so that gearshift shaft 4d is isolated from the rotary power of input shaft 3 driven by engine 120 via CVT 121.

In rear wheel driving gear chamber 17, a gear 4e is fixed on gearshift shaft 4d axially opposite shifter 4a with respect to reverse travel driven gear 4c, and meshes with a gear 4f fixed on final pinion shaft 4g. A final pinion 4h is fixed on final pinion shaft 4g and meshes with a bull gear 5b serving as an input gear of differential gear unit 5. Therefore, gears 4e and 4f, final pinion 4h and bull gear 5b constitute the speed reduction gear train interposed between gearshift shaft 4d and differential gear unit 5.

In rear wheel driving gear chamber 17, differential gear unit 5 includes a differential casing 5a on which bull gear 5b serving as the input gear is fixed. Differential pinions 5c are pivoted in differential casing 5a via a pivot axis perpendicular to first output shafts 6. Proximal ends of right and left first output shafts 6 are disposed in differential casing 5a, and are fixedly provided thereon with respective differential side gears 5d. Differential pinions 5c are disposed between differential side gears 5d on respective right and left first output shafts 6 so that each differential pinion 5c meshes with both differential side gears 5d on right and left first output shafts 6.

A differential lock slider 5e is fitted on one of right and left first output shafts 6 (in this embodiment, right first output shaft 6). Differential lock slider 5e is axially slidable along first output shaft 6 so as to shift between a differential locking position to engage with differential casing 5a and a differential unlocking position to disengage from differential casing 5a.

Motor-and-clutch chamber 18 includes a motor chamber section 18a mainly formed in motor housing 2c, a clutch chamber section 18c mainly formed in the right portion of main housing 2a, and a gear chamber section 18b formed in the right portion of main housing 2a to extend between motor chamber section 18a and clutch chamber section 18c.

Motor chamber section 18a is formed as a laterally axial cylindrical chamber. Motor 8, including a rotor 8r and a stator 8s surrounding rotor 8r, is disposed in motor chamber section 18a so that an outer circumferential surface of stator 8s is tightly fitted to an inner circumferential surface of motor housing 2c defining motor chamber section 18a, so that stator 8s is fixed to motor housing 2c. Motor 8 includes a laterally horizontal motor shaft 8a serving as an axis of rotor 8r, i.e., a rotary axis of motor 8.

Motor chamber section 18a is open at a right end of motor housing 2c. A motor cover 2e is attached to the right end of motor housing 2c so as to cover the right end opening of motor chamber section 18a, thereby covering motor 8 fitted in motor chamber section 18a. Motor cover 2e is fastened to motor housing 2c via a bolt (not shown) or the like, so that motor cover 2e is detachable from motor housing 2c.

A basal right end portion of motor shaft 8a is journalled by motor cover 2e via a bearing. A left end portion of motor shaft 8a projects leftward from rotor 8r of motor 8 so as to serve as a motor output end portion 8b for outputting the motor power of motor 8. An utmost left end of motor shaft 8a is journalled by main housing 2a via a bearing.

Therefore, only by detaching motor cover 2e from motor housing 2c, motor chamber section 18a is open rightward, so that motor 8 can be easily moved together with motor cover 2e outward from motor chamber section 18a, thereby facilitating maintenance of motor 8.

On the other hand, motor 8 can be inserted into motor chamber section 18a easily via the right end opening of motor chamber section 18a. When motor 8 reaches its proper axial position in motor chamber section 18a, motor cover 2e comes to abut against the right end of motor housing 2c so that motor cover 2e can be fastened to motor housing 2c by bolts or the like, thereby facilitating installation of motor 8 into rear transaxle casing 2.

Various kinds of motors, e.g., an SR (Switched Reluctance) motor, an AC (alternate current) motor, a DC (direct current) motor, and a PM (Permanent Magnet) motor, are adaptable as motor 8. Any kind of motor having any capacity is selected as motor 8 in correspondence to the kind, use and required performance of UTV 100.

In motor-and-clutch chamber 18, a motor output gear 11 is fixed on motor output end portion 8b of motor shaft 8a. A distribution gear 13 is disposed in clutch chamber section 18c, and an idle gear 12 is disposed in gear chamber section 18b, so that motor output gear 11 meshes with distribution gear 13 via idle gear 12. Motor output gear 11, idle gear 12 and distribution gear 13 constitute a motor gear train 15 drivingly connecting motor 8 to first and second clutches 9 and 10.

Distribution gear 13 has an axial center through hole 13a open at right and left ends thereof. A left clutch drum 9a is disposed at a left side of distribution gear 13, i.e., closer to CVT 121 in the lateral direction of transaxle 1, and a right clutch drum 10a is disposed at a right side of distribution gear 13, i.e., opposite CVT 121 with respect to distribution gear 13 in the lateral direction of transaxle 1.

A right end portion of left clutch drum 9a and a left end portion of right clutch drum 10a are fitted into axial center through hole 13a of distribution gear 13, so that left and right clutch drums 9a and 10a are rotatably integrated with distribution gear 13, i.e., unrotatable relative to distribution gear 13.

A right end portion of input shaft 3 is supported in left clutch drum 9a via a bearing so as to be rotatable relative to left clutch drum 9a, i.e., distribution gear 13. A left end portion of second output shaft 7 disposed coaxially to input shaft 3 is supported in right clutch drum 10a via a bearing so as to be rotatable relative to right clutch drum 10a, i.e., distribution gear 13.

A discoid clutch member 9b is disposed along a wall of main housing 2a defining a left end of clutch chamber section 18c, and is fixed on the right end portion of input shaft 3. Friction members 9c are layered in left clutch drum 9a along the right end portion of input shaft 3 so as to be interposed between left clutch drum 9a and discoid clutch member 9b. Friction members 9c consist of friction members fitted rotatably integrally to left clutch drum 9a and friction members fitted rotatably integrally to discoid clutch member 9b.

A clutch actuator 9d with a solenoid is provided on discoid clutch member 9b, and the solenoid of clutch actuator 9d is disposed in the wall of main housing 2a. A wire 9e is extended from the solenoid of clutch actuator 9d through the wall of main housing 2a, and is extended outward from rear transaxle casing 2 so as to be connected to a later-discussed electronic control unit (hereinafter referred to as "ECU") 180 (see FIG. 14) of UTV 100.

Therefore, left clutch drum 9a, discoid clutch member 9b, friction members 9c, clutch actuator 9d and wire 9e constitute an electromagnetic clutch serving as first clutch 9 interposed between distribution gear 13 and input shaft 3.

When clutch actuator 9d acts to press friction members 9c against one another, discoid clutch member 9b engages to left clutch drum 9a so as to be rotatably integral with left clutch drum 9a so that first clutch 9 is engaged, or on-operated, thereby enabling power to flow between distribution gear 13 and input shaft 3.

When clutch actuator 9d acts to separate friction members 9c from one another, discoid clutch member 9b disengages from left clutch drum 9a so as to be rotatable relative to left clutch drum 9a so that first clutch 9 is disengaged, or off-operated, thereby isolating input shaft 3 from the rotary power of distribution gear 13 as the motor power from motor 8, or thereby isolating distribution gear 13 and motor 8 from the rotary power of input shaft 3 as the engine power from engine 120 via CVT 121.

Therefore, motor 8 is drivingly connected via motor gear train 15, including gears 11, 12 and 13, to input shaft 3 for driving rear wheels 105 only if first clutch 9 is engaged. During the engagement of first clutch 9, if engine 120 is stationary and motor 8 is turned on, the rotary power of distribution gear 13 driven by the motor power from motor 8 via motor gear train 15 is transmitted to input shaft 3. During the engagement of first clutch 9, if engine 120 is driven and motor 8 is turned off, the engine power from engine 120 is transmitted to motor 8 via motor gear train 15 so as to rotate motor 8 for generating electric power.

A discoid clutch member 10b is disposed along a wall of motor housing 2c defining a right end of clutch chamber section 18c, and is fixed on the left end portion of second output shaft 7. Friction members 10c are layered in right clutch drum 10a along the left end portion of second output shaft 7 so as to be interposed between right clutch drum 10a and discoid clutch member 10b. Friction members 10c consist of friction members fitted rotatably integrally to right clutch drum 10a and friction members fitted rotatably integrally to discoid clutch member 10b.

A clutch actuator 10d with a solenoid is provided on discoid clutch member 10b, and the solenoid of clutch actuator 10d is disposed in the wall of motor housing 2c. A wire 10e is extended from the solenoid of clutch actuator 10d through the wall of motor housing 2c, and is extended outward from rear transaxle casing 2 so as to be connected to ECU 180 of UTV 100.

Therefore, right clutch drum 10a, discoid clutch member 10b, friction members 10c, clutch actuator 10d, and wire 10e constitute an electromagnetic clutch serving as second clutch 10 interposed between distribution gear 13 and second output shaft 7.

When clutch actuator 10d acts to press friction members 10c against one another, discoid clutch member 10b engages to right clutch drum 10a so as to be rotatably integral with right clutch drum 10a so that second clutch 10 is engaged, or on-operated, thereby enabling power to flow between distribution gear 13 and second output shaft 7.

When clutch actuator 10d acts to separate friction members 10c from one another, discoid clutch member 10b disengages from right clutch drum 10a so as to be rotatable relative right clutch drum 10a so that second clutch 10 is disengaged, or off-operated, thereby isolating second output shaft 7 from the rotary power of distribution gear 13 driven by the motor power from motor 8 and/or the engine power from input shaft 3.

Therefore, distribution gear 13 is drivingly connected to second output shaft 7 for driving front wheels 104 only if second clutch 10 is engaged. During the engagement of second clutch 10, if motor 8 is turned on, distribution gear 13 is driven by the motor power from motor 8 via gears 11 and 12 so that the rotary power of distribution gear 13 is transmitted to second output shaft 7 via second clutch 10. During the engagement of second clutch 10, if motor 8 is turned off, a rotary force of front wheels 104 can backflow to motor 8 so as to rotate motor 8 (i.e., rotor 8r) to generate electric power.

PTO housing 2d is joined to a right end portion of motor housing 2c so that PTO housing 2d and a right portion of motor housing 2c define a front wheel driving gear chamber 19 partitioned from motor-and-clutch chamber 18 by a wall of motor housing 2c.

A right end portion of second output shaft 7 is disposed in front wheel driving gear chamber 19, and a bevel gear 7a is fixed (or formed) on the right end portion of second output shaft 7. A rear end portion of PTO shaft 14 is also disposed in front wheel driving gear chamber 19, and a bevel gear 14a is formed (or fixed) on the rear end portion of PTO shaft 14. Bevel gears 7a and 14a mesh with each other so as to constitute a front wheel driving gear train 16.

In this embodiment, bevel gear 14a is diametrically larger than bevel gear 7a so that front wheel driving gear train 16 serves as a speed reduction gear train. Alternatively, bevel gears 7a and 14a may have the same diameter so as to constitute a constant velocity gear train or bevel gear 7a may be diametrically larger than bevel gear 14a so as to constitute a speed increasing gear train.

Therefore, PTO shaft 14 for driving front wheels 104 is driven only if second clutch 10 is engaged to transmit a rotary power of distribution gear 13 to second output shaft 7.

During the engagement of second clutch 10, if motor 8 is turned on, the rotary power of distribution gear 13 driven by the motor power from motor 8 via gears 11 and 12 is transmitted to second output shaft 7, front wheel driving gear train 16 and PTO shaft 14.

During the engagement of second clutch 10, if engine 120 is turned on and first clutch 9 is also engaged, the engine power from engine 120 is transmitted to second output shaft 7, front wheel driving gear train 16 and PTO shaft 14 via CVT 121, input shaft 3, engaged first clutch 9, distribution gear 13 and engaged second clutch 10.

Further, during the engagement of second clutch 10, if front wheels 104 free from the engine power and the motor power receive a rotary force from the ground such as to accelerate front wheels 104, the rotary force backflows to motor 8 via differential gear unit 52 in front transaxle casing 50, PTO shaft 14, front wheel driving gear train 16, second output shaft 7, engaged second clutch 10, and motor gear train 15. Motor 8 converts the backflowing rotary force to electric power. The electric power regenerated by motor 8 is reserved in buttery 190. Therefore, the regeneration action of motor 8 functions as a brake for preventing front wheels 104 from being unexpectedly accelerated.

Since first and second clutches 9 and 10 are electromagnetic clutches, whether friction members 9*c* or 10*b* of each of first and second clutches 9 and 10 are pressed against one another or are separated from one another, i.e., whether each of first and second clutches 9 and 10 is engaged or disengaged, depends on whether the solenoid of its clutch actuator 9*d* or 10*d* is excited or unexcited. Alternatively, each of first and second clutches 9 and 10 may be a hydraulic clutch or another kind of clutch.

Figure 6:
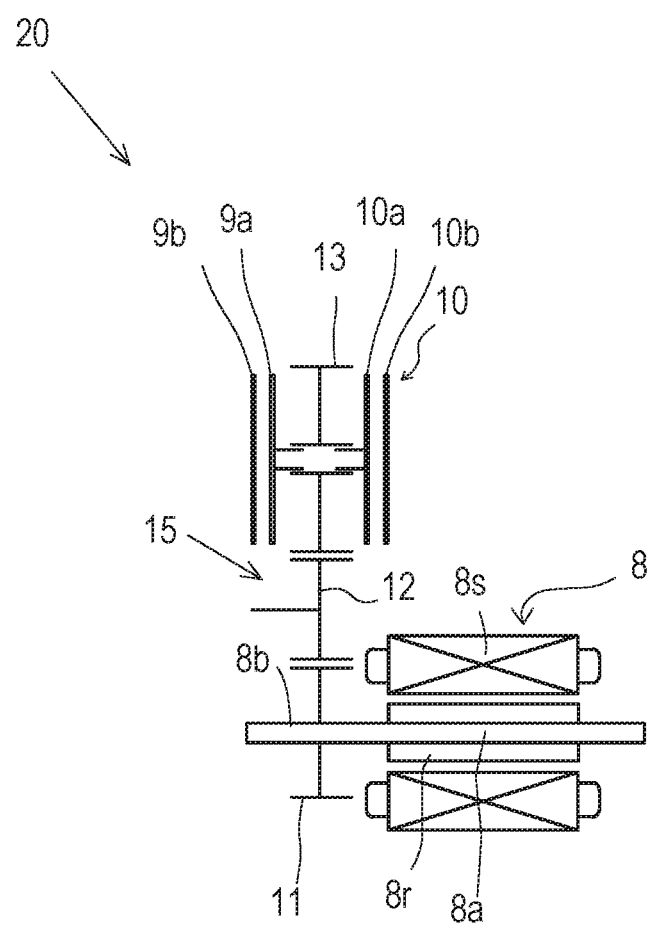
FIG. 6 is a skeleton diagram of a motor-and-clutch assembly for the transaxle according to the first embodiment.

Referring to FIG. 6, an assembly of motor 8, motor gear train 15, first clutch 9 and second clutch 10 is defined as a motor-and-clutch assembly 20. Therefore, transaxle 1 includes motor-and-clutch assembly 20 disposed in motor-and-clutch chamber 18 formed by the right portion of main housing 2*a* and motor housing 2*c* of rear transaxle casing 2.

Figure 7:
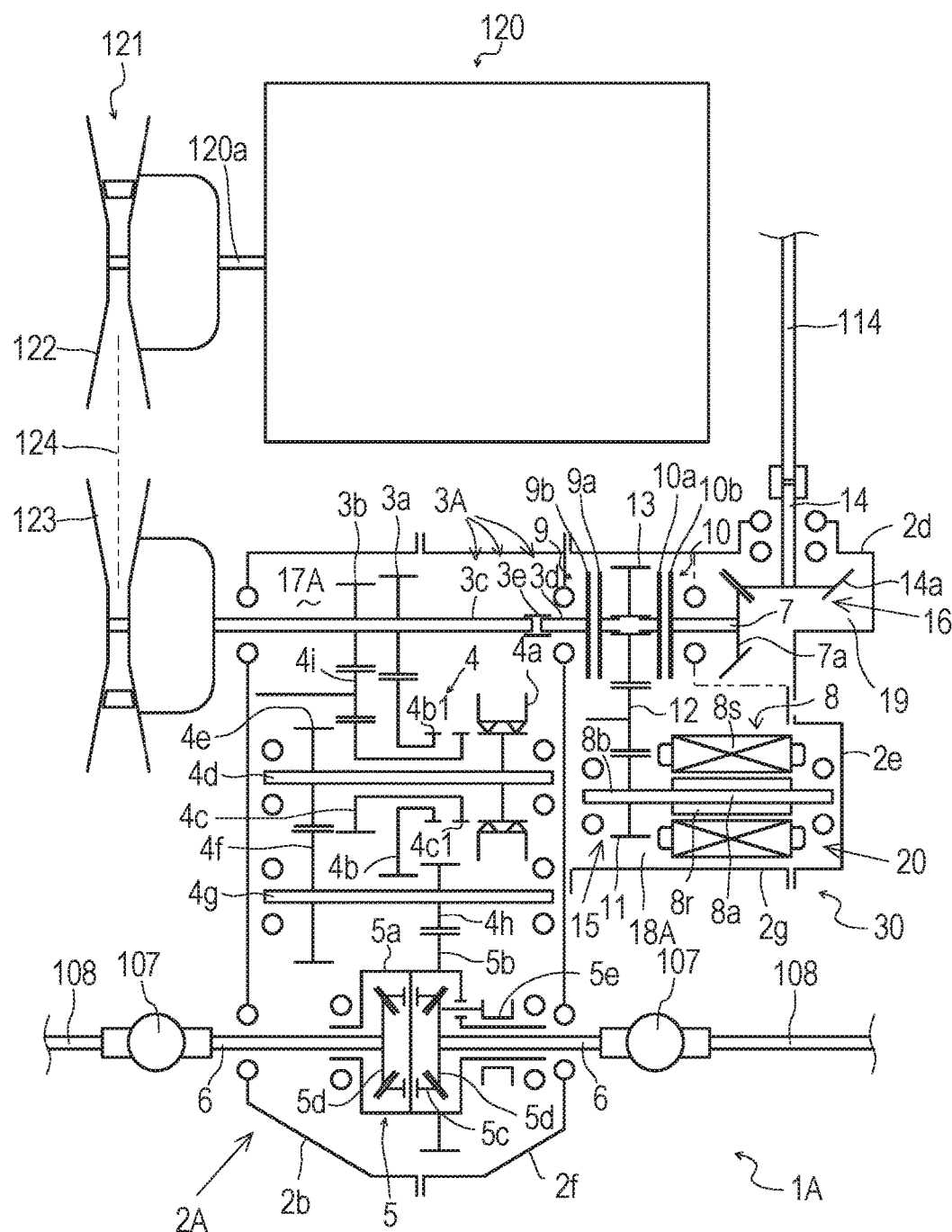
FIG. 7 is a skeleton diagram of a hybrid vehicle driving system including the transaxle according to the first embodiment, the transaxle being modified to include a motor unit including the motor-and-clutch assembly.

Referring to FIG. 7, transaxle 1 may be modified as a transaxle 1A including a motor unit 30 including motor-and-clutch assembly 20.

In this regard, transaxle 1A includes a rear transaxle casing 2A. Rear transaxle casing 2A includes a main housing 2*f*, gear housing 2*b*, a motor housing 2*g*, PTO housing 2*d* and motor cover 2*e*. Gear housing 2*b*, PTO housing 2*d* and motor cover 2*e* are identical to those of rear transaxle casing 2 of transaxle 1.

Main housing 2*f* and gear housing 2*b* are joined to each other so as to define a rear wheel driving gear chamber 17A incorporating reverser gear transmission 4 and differential gear unit 5, similar to rear wheel driving gear chamber 17 defined by joining main housing 2*a* and gear housing 2*b* of rear transaxle casing 2.

The difference of main housing 2*f* from main housing 2*a* is that a right end of main housing 2*f* defines a right end of rear wheel driving gear chamber 17A. In other words, main housing 2*f* is not formed with a right portion extended rightward from the right end of rear wheel driving gear chamber 17A so as to define at least a portion of a motor-and-clutch chamber 18A, in comparison with main housing 2*a*, which is formed with the right portion extended rightward from the right end of rear wheel driving gear chamber 17 so as to define the left portion of motor-and-clutch chamber 18, including gear chamber section 18*b* and clutch chamber section 18*c*.

Motor housing 2*g* is formed therein with entire motor-and-clutch chamber 18A in which motor 8, motor gear train 15 and first and second clutches 9 and 10 are entirely disposed, except that motor cover 2*e* is attached to motor housing 2*g* to cover the right end of motor 8.

On the contrary, regarding transaxle 1, motor housing 2*c* of rear transaxle casing 2 is formed therein with only the right portion of motor-and-clutch chamber 18 including motor chamber section 18*a*. When main housing 2*a* and motor housing 2*c* are separated from each other, motor-and-clutch chamber 18 has to be divided into the left portion in main housing 2*a* and the right portion in motor housing 2*c*, and motor-and-clutch assembly 20, including motor 8, motor gear train 15, and first and second clutches 9 and 10, has to be disassembled so as to separate second output shaft 7 journalled by motor housing 2*c* from input shaft 3 journalled by main housing 2*a*.

Therefore, transaxle 1A includes motor unit 30. Motor unit 30 includes motor-and-clutch assembly 20 of motor 8, motor gear train 15 and first and second clutches 9 and 10, and includes motor housing 2*g* incorporating entire motor-and-clutch assembly 20. Motor unit 30 is detachable from main housing 2*f* defining rear wheel driving gear chamber 17A with neither dividing of motor-and-clutch chamber 18A nor disassembling of motor-and-clutch assembly 20.

When motor unit 30 is attached to main housing 2*a*, a left end portion of motor housing 2*g* is joined to the right end of main housing 2*f* defining the right end of rear wheel driving gear chamber 17A. In this regard, an input shaft 3A of transaxle 1A is divided into a main shaft portion 3*c* and a clutch shaft portion 3*d* at a portion thereof close to the right end of rear wheel driving gear chamber 17A. In rear wheel driving gear chamber 17A, main shaft portion 3*c* is formed (or fixedly provided) thereon with forward travel driving gear 3*a* and reverse travel driving gear 3*b*.

A coupling sleeve 3*e* formed with inner splines is provided on a right end portion of main shaft portion 3*c*. Clutch shaft portion 3*d* is journalled by the left end portion of motor housing 2*g* via first clutch 9 so as to serve as the right end portion of input shaft 3A to be drivingly connected to distribution gear 13 via first clutch 9.

Therefore, when the left end portion of motor housing 2*g* is joined to the right end of main housing 2*f*, the left end of clutch shaft portion 3*d* is spline-fitted into coupling sleeve 3*e* so as to connect clutch shaft portion 3*d* to main shaft portion 3*c* via coupling sleeve 3*e* unrotatably relative to main shaft portion 3*c*, thereby completing input shaft 3A.

On the other hand, motor unit 30 incorporating entire motor-and-clutch assembly 20 is easily detachable from mutually joined main and gear housings 2*f* and 2*b* of rear transaxle casing 2A defining rear wheel driving gear chamber 17A only by detaching gear housing 2*g* from the right end of main housing 2*f* and by extracting clutch shaft portion 3*d* from coupling sleeve 3*e* to separate clutch shaft portion 3*d* from main shaft portion 3*c*.

Further, a right portion of motor housing 2*g* and PTO housing 2*d* are joined to each other so as to define front wheel driving gear chamber 19 similar to that of rear transaxle casing 2. Second output shaft 7 is extended between motor-and-clutch chamber 18A and front wheel driving gear chamber 19.

The mechanical connection of second output shaft 7 to distribution gear 13 via second clutch 10 can be kept regardless of whether motor housing 2*g* is joined to main housing 2*a* or is separated from main housing 2*a*. Therefore, motor unit 30 including motor-and-clutch assembly 20 also serves as a PTO unit including second output shaft 7, front wheel driving gear train 16 and PTO shaft 14.

Figure 8:
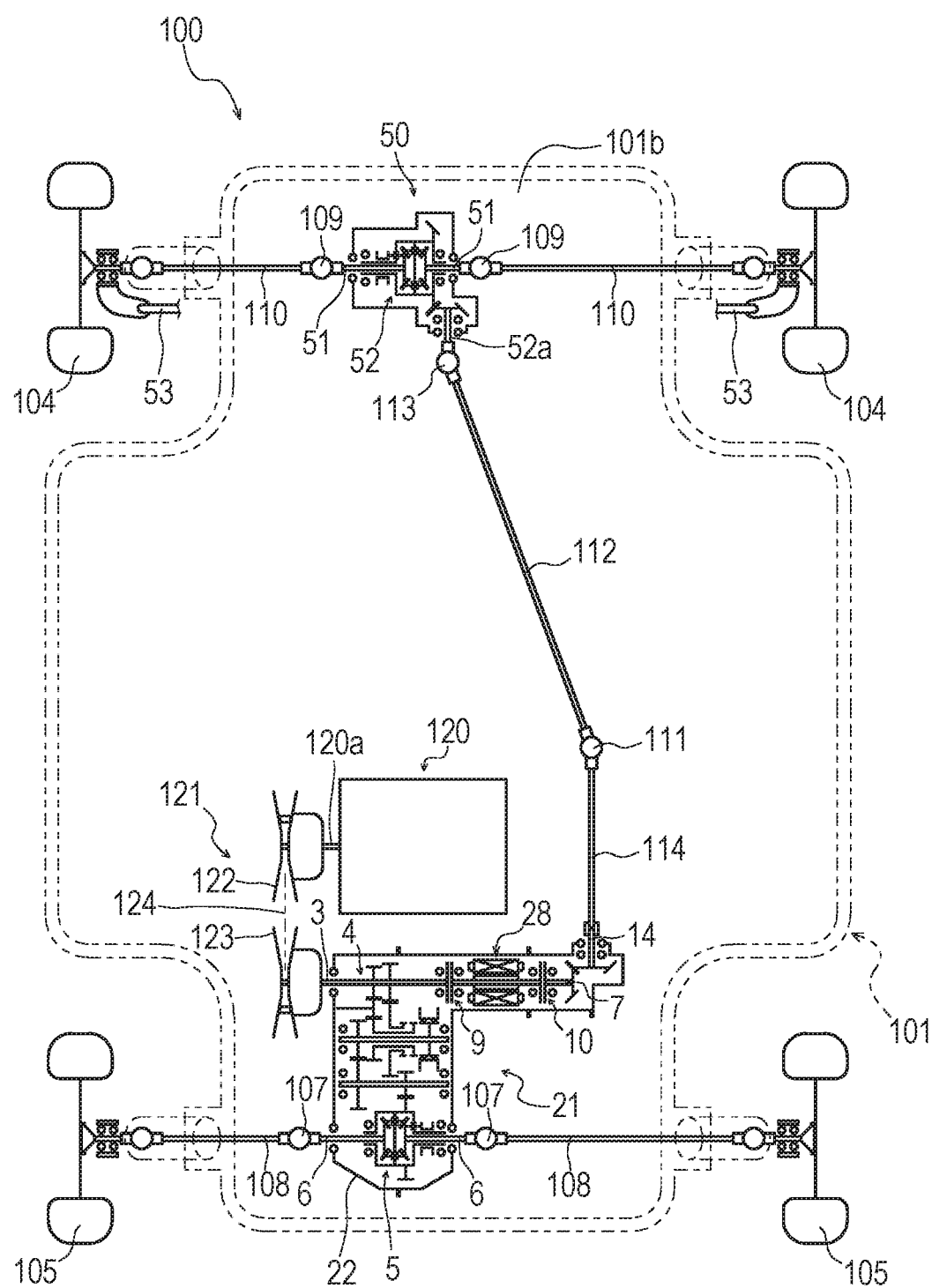
FIG. 8 is a schematic plan view of a hybrid vehicle equipped with a transaxle according to a second embodiment.

Referring to FIG. 8, UVT 100 may be equipped with an alternative transaxle 21. In UTV 100, transaxle 21 includes a rear transaxle casing 22 carrying right and left rear wheels 105 and incorporating reverser gear transmission 4 and differential gear unit 5.

Transaxle 21 includes input shaft 3 projecting outward (in this embodiment, leftward) from rear transaxle casing 22 so as to be drivingly connected to engine 120 via CVT 121. Also, transaxle 21 includes PTO shaft 14 projecting outward (in this embodiment, forward) from rear transaxle casing 22 so as to be drivingly connected to differential gear unit 52 in front transaxle casing 50 carrying front wheels 104.

In FIG. 8, the same reference numerals as those in FIGS. 1 and 2 designate respective component elements having identical or similar functions or configurations to the corresponding component elements in FIGS. 1 and 2 designated by the same reference numerals.

Transaxle 21 will be described in detail with reference to FIGS. 9 to 12. Description of the component elements designated by the same reference numerals as those used in FIGS. 3 to 6 is omitted because of the above-mentioned reason. Further, it is assumed that rear transaxle casing 22 of transaxle 21 is provided with CVT 121 at the left side thereof, and is provided with PTO shaft 14 at the right portion thereof laterally opposite CVT 121, similar to the above-mentioned assumption with regard to rear transaxle casing 2 of transaxle 1.

Rear transaxle casing 22 includes a main housing 22a, a gear housing 22b, a motor housing 22c, and a PTO housing 22d. Gear housing 22b and PTO housing 22d are identical or similar to gear housing 2b and PTO housing 2d of rear transaxle casing 2, respectively.

Gear housing 22b and a left portion of main housing 22a are joined to each other so as to define a rear wheel driving gear chamber 24, in which input shaft 3, reverser gear transmission 4, differential gear unit 5, and right and left first output shafts 6 are arranged in the same way as those in rear wheel driving gear chamber 17 formed in gear housing 2b and the left portion of main housing 2a of rear transaxle casing 2.

A right portion of motor housing 22c and PTO housing 22d are joined to each other so as to define a front wheel driving gear chamber 26, in which the right end portion of second output shaft 7, the rear end portion of PTO shaft 14, and front wheel driving gear train 16 including bevel gears 7a and 14a are arranged in the same way as those in front wheel driving gear chamber 19 formed in the right portion of motor housing 2c and PTO housing 2d of rear transaxle casing 2.

A right portion of main housing 22a and a left portion of motor housing 22c are joined to each other so as to define a laterally axial cylindrical motor-and-clutch chamber 25 therein. Motor-and-clutch chamber 25 includes a left portion for incorporating first clutch 9, a right portion for incorporating second clutch 10, and an axially (laterally) middle portion for incorporating an alternative electric motor 28 for transaxle 21. The left and middle portions of motor-and-clutch chamber 25 are formed by the right portion of main housing 22a, and the right portion of motor-and-clutch chamber 25 is formed by the left portion of motor housing 22c.

A main portion of motor 28, including a rotor 28r and a stator 28s surrounding rotor 28r, is disposed in the middle portion of motor-and-clutch chamber 25, so that an outer circumferential surface of stator 28s is tightly fitted to an inner circumferential surface of the middle portion of motor-and-clutch chamber 25. Motor 28 includes a motor shaft 28a serving as an axis of rotor 28r, i.e., a rotary axis of motor 28.

Motor shaft 28a has axially opposite motor output end portions 28b and 28c that project rightward and leftward from right and left ends of rotor 28r, i.e., the main body of motor 28. Each of motor output end portions 28b and 28c of motor shaft 28a functions as a motor output shaft that outputs a motor power outputted from motor 28.

In this regard, aforesaid motor 8 has only motor output end portion 8b that is the left end portion of motor shaft 8a projecting leftward from the main portion of motor 8 to serve as the motor output shaft. The right end portion of motor shaft 8a does not function as a motor output shaft but merely projects to be journalled by motor cover 2e via the bearing.

Motor 28 is disposed between input shaft 3 and second output shaft 7 so that motor shaft 28a serving as the rotary axis of motor 28 is extended coaxially to input shaft 3 and second output shaft 7.

The right end portion of input shaft 3 is disposed in the left portion of motor-and-clutch chamber 25. In the left portion of motor-and-clutch chamber 25, left clutch drum 9a is fixed on left motor output end portion 28b of motor shaft 28a by spline-fitting, and discoid clutch member 9b is fixed on the right end portion of input shaft 3 by spline-fitting and is disposed along the left end of motor-and-clutch chamber 25, so as to constitute first clutch 9 interposed between the right end portion of input shaft 3 and left motor output end portion 28b of motor shaft 28a. First clutch 9 further includes friction members 9c, clutch actuator 9d and wire 9e, similar to those of first clutch 9 of transaxle 1.

The left end portion of second output shaft 7 is disposed in the right portion of motor-and-clutch chamber 25. In the right portion of motor-and-clutch chamber 25, right clutch drum 10a is fixed on right motor output end portion 28c of motor shaft 28a by spline-fitting, and discoid clutch member 10b is fixed on the left end portion of second output shaft 7 by spline-fitting, and is disposed along the right end of motor-and-clutch chamber 25, so as to constitute second clutch 10 interposed between right motor output end portion 28c of motor shaft 28a and the left end portion of second output shaft 7. Second clutch 10 further includes friction members 10c, clutch actuator 10d and wire 10e, similar to those of second clutch 10 of transaxle 1.

Therefore, when motor housing 22c is detached from the right portion of main housing 22a and is moved together with second output shaft 7 and second clutch 10 away from the right portion of main housing 22a, the right portion of motor-and-clutch chamber 25 formed by motor housing 22c is separated from the left and middle portions of motor-and-clutch chamber 25 formed by main housing 22a, and right clutch drum 10a having been spline-fitted on right motor output end portion 28c is slid along right motor output end portion 28c and is separated from right motor output end portion 28c. In this way, motor housing 22c, supporting second clutch 10, second output shaft 7, and PTO shaft 14, can be easily removed from main housing 22a, in which motor 28 and first clutch 9 are left in the left and middle portions of motor-and-clutch chamber 25 formed by main housing 22a.

Therefore, the middle and left portion of motor-and-clutch chamber 25 in main housing 22a is open rightward, so that motor 28 can easily be removed from first clutch 9 and be withdrawn from motor-and-clutch chamber 25 in main housing 22a, and first clutch 9 can be removed from the right end portion of input shaft 3 and be withdrawn from motor-and-clutch chamber 25 in main housing 22a. Also, motor housing 22c removed from main housing 22a has the right portion of motor-and-clutch chamber 25 open leftward, so that second clutch 10 can easily be removed from the left end portion of second output shaft 7. Such easy detachment of motor housing 22c from main housing 22a facilitates maintenance of motor 28 and first and second clutches 9 and 10.

Figure 12:
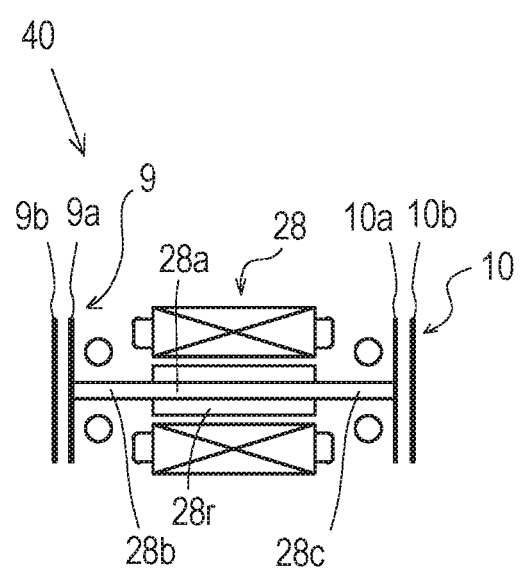
FIG. 12 is a skeleton diagram of a motor-and-clutch assembly for the transaxle according to the second embodiment.

Referring to FIG. 12, an assembly of motor 28, first clutch 9 and second clutch 10 is defined as a motor-and-clutch assembly 40. Therefore, transaxle 21 includes motor-and-clutch assembly 40 disposed in motor-and-clutch chamber 25 formed by the right portion of main housing 22a and motor housing 22c of rear transaxle casing 22.

Figure 13:
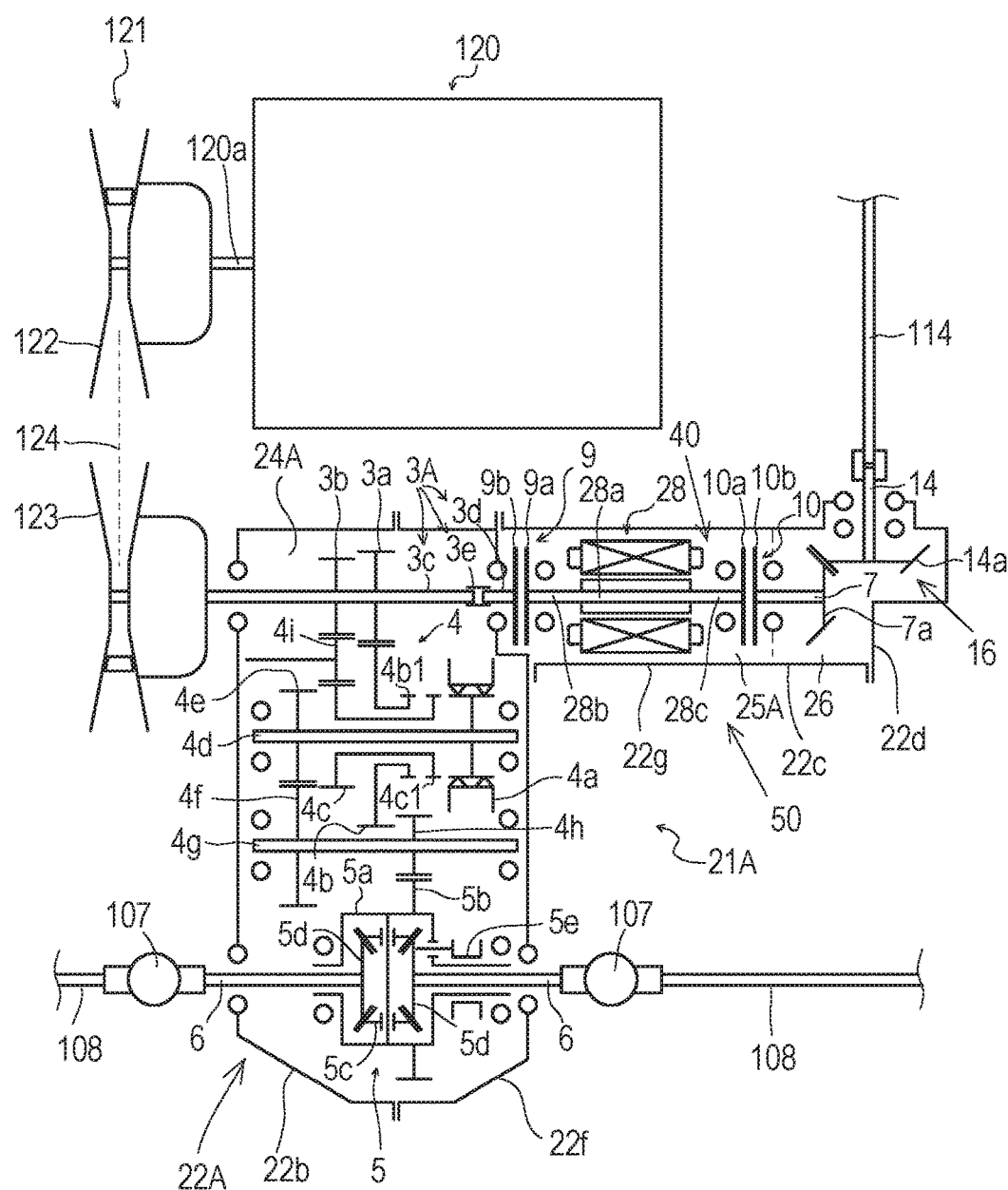
FIG. 13 is a skeleton diagram of a hybrid vehicle driving system including the transaxle according to the second embodiment, the transaxle being modified to include a motor unit including the motor-and-clutch assembly.

Referring to FIG. 13, transaxle 21 may be modified as a transaxle 21A including a motor unit 50 including motor-and-clutch assembly 40. In this regard, transaxle 21A includes a rear transaxle casing 22A. Rear transaxle casing 22A includes a main housing 22f, gear housing 22b, a motor housing 22g and PTO housing 22d. Gear housing 22b and PTO housing 22d are identical to those of rear transaxle casing 22 of transaxle 21.

Main housing 22f and gear housing 22b are joined to each other so as to define a rear wheel driving gear chamber 24A incorporating reverser gear transmission 4 and differential gear unit 5, similar to rear wheel driving gear chamber 24 defined by joining main housing 22a and gear housing 22b of rear transaxle casing 22.

The difference of main housing 22f from main housing 22a is that a right end of main housing 22f defines a right end of rear wheel driving gear chamber 24A. In other words, main housing 22f is not formed with a right portion extended rightward from the right end of rear wheel driving gear chamber 24A so as to define at least a portion of a motor-and-clutch chamber 25A, in comparison with main housing 22a, which is formed with the right portion extended rightward from the right end of rear wheel driving gear chamber 24 so as to define the left and middle portions of motor-and-clutch chamber 25.

Motor housing 22g is formed therein with entire motor-and-clutch chamber 25 in which motor 28 and first and second clutches 9 and 10 are entirely disposed.

On the contrary, motor housing 22c of rear transaxle casing 22 is formed therein with only the right portion of motor-and-clutch chamber 25. When main housing 22a and motor housing 22c are separated from each other, motor-and-clutch chamber 25 has to be divided into the left and middle portions in main housing 22a and the right portion in motor housing 22c, and motor-and-clutch assembly 40, including motor 8 and first and second clutches 9 and 10, has to be disassembled so as to separate second output shaft 7 journalled by motor housing 22c from input shaft 3 journalled by main housing 22a.

Therefore, transaxle 21A includes motor unit 50. Motor unit 50 includes motor-and-clutch assembly 40 of motor 8 and first and second clutches 9 and 10, and includes motor housing 22g incorporating entire motor-and-clutch assembly 40. Motor unit 50 is detachable from main housing 22f defining rear wheel driving gear chamber 24A with neither dividing of motor-and-clutch chamber 25A nor disassembling of motor-and-clutch assembly 40.

When motor unit 50 is attached to main housing 22a, a left end portion of motor housing 22g is joined to the right end of main housing 22f defining the right end of rear wheel driving gear chamber 24A. In this regard, transaxle 21A includes input shaft 3A dividable into main shaft portion 3c and clutch shaft portion 3d at its portion close to the right end of rear wheel driving gear chamber 24A, similar to input shaft 3A of transaxle 1A as shown in FIG. 6. The right end portion of main shaft portion 3c and the left end portion of clutch shaft portion 3d are spline-fitted into coupling sleeve 3e so as to complete entire input shaft 3A, when motor unit 50 is attached to main housing 22f by attaching the left end portion of motor housing 22g to the right end of main housing 22f.

On the other hand, motor unit 50 incorporating entire motor-and-clutch assembly 40 is easily detachable from mutually joined main and gear housings 22f and 22b of rear transaxle casing 22A defining rear wheel driving gear chamber 24A only by detaching gear housing 22g from the right end of main housing 22f and by extracting clutch shaft portion 3d from coupling sleeve 3e to separate clutch shaft portion 3d from main shaft portion 3c.

Further, a right portion of motor housing 22g and PTO housing 22d are joined to each other so as to define front wheel driving gear chamber 26 incorporating the right end portion of second output shaft 7, the rear end portion of PTO shaft 14, and front wheel driving gear train 16, similar to that of rear transaxle casing 22. Therefore, motor unit 50 including motor-and-clutch assembly 40 also serves as a PTO unit including second output shaft 7, front wheel driving gear train 16 and PTO shaft 14.

Figure 4:
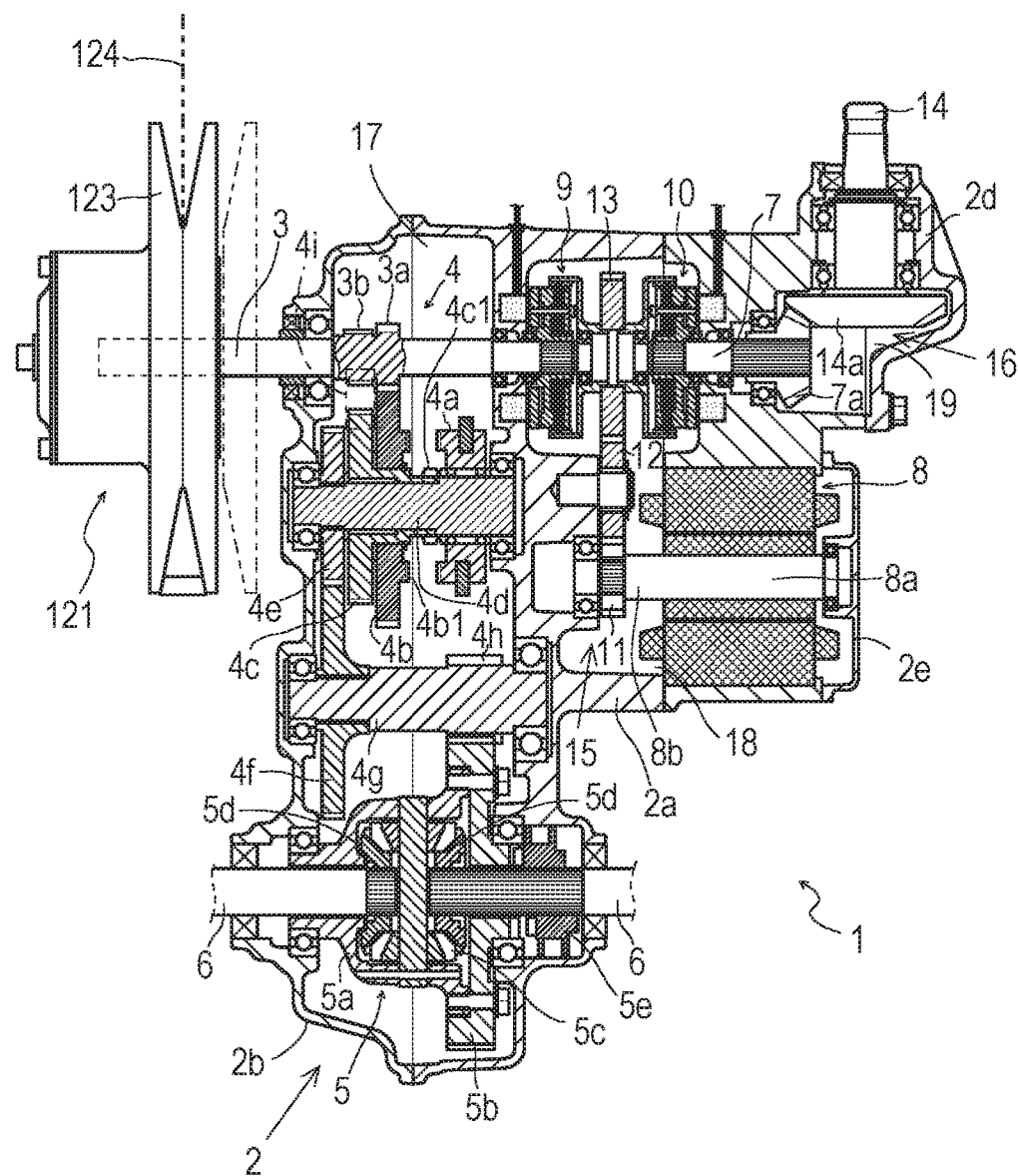
FIG. 4 is a sectional plan view of the transaxle according to the first embodiment.
Figure 5:
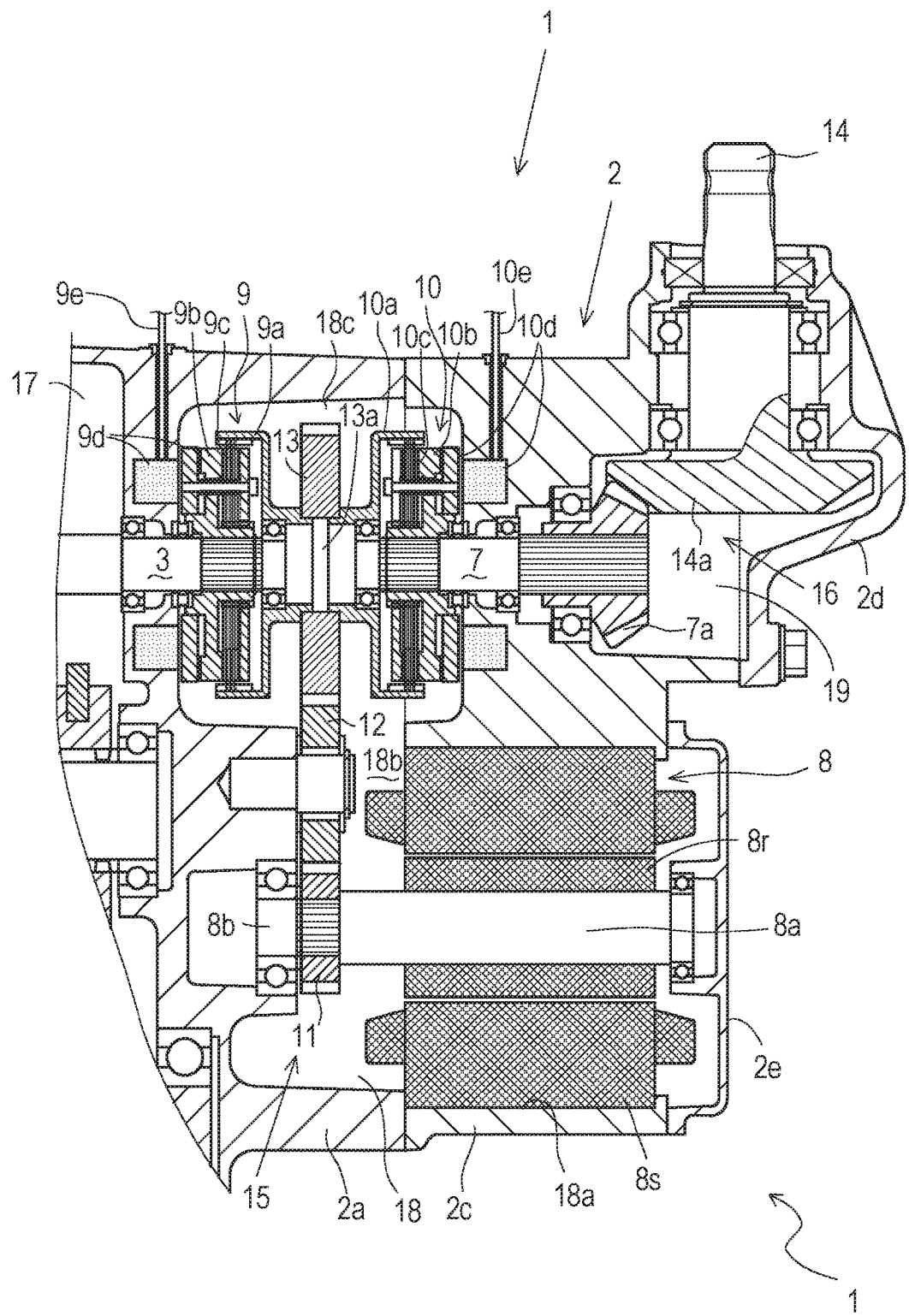
FIG. 5 is a fragmentary sectional plan view of a portion of the transaxle according to the first embodiment, incorporating a motor and first and second clutches.
Figure 9:
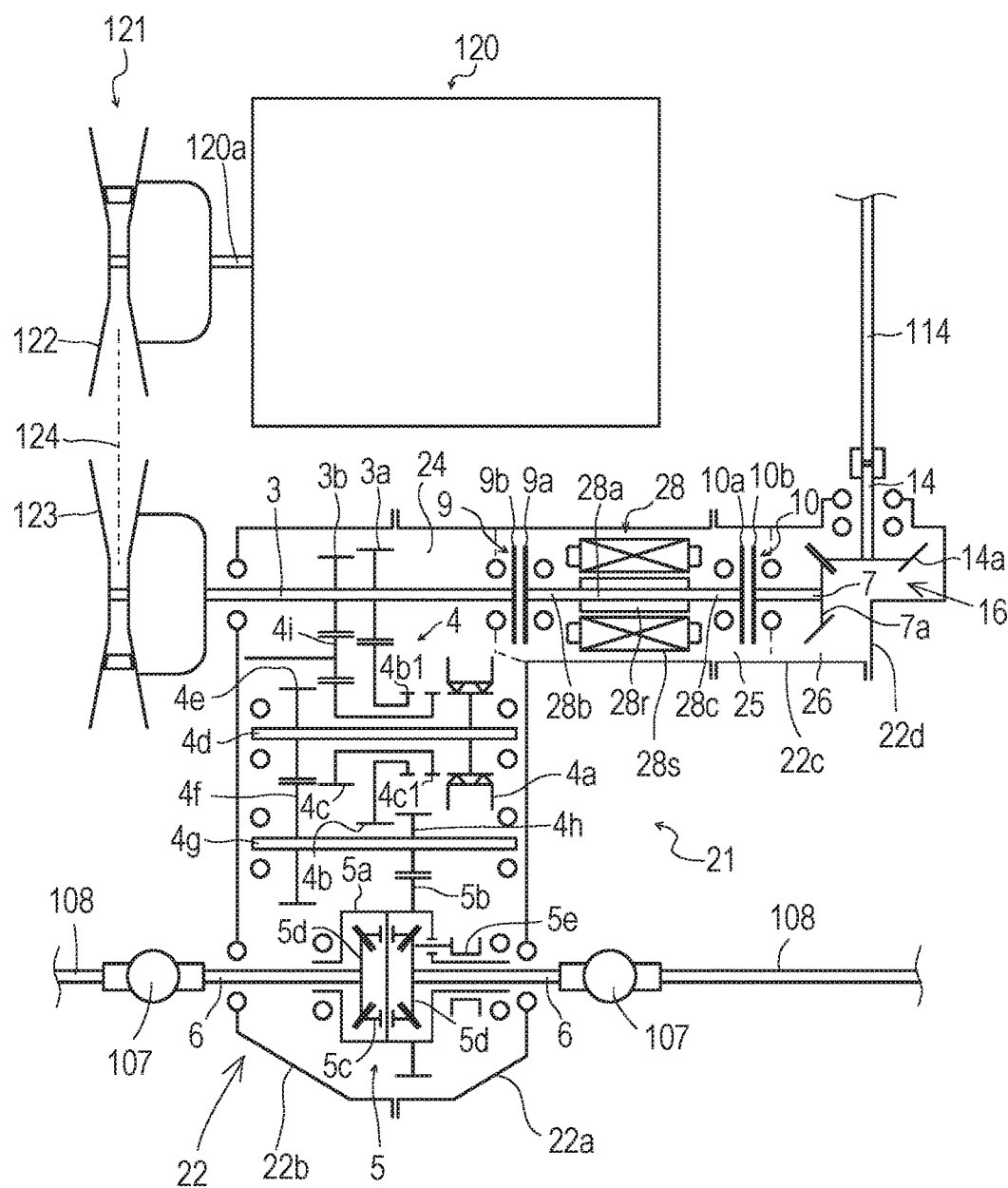
FIG. 9 is a skeleton diagram of a hybrid vehicle driving system including the transaxle according to the second embodiment.
Figure 10:
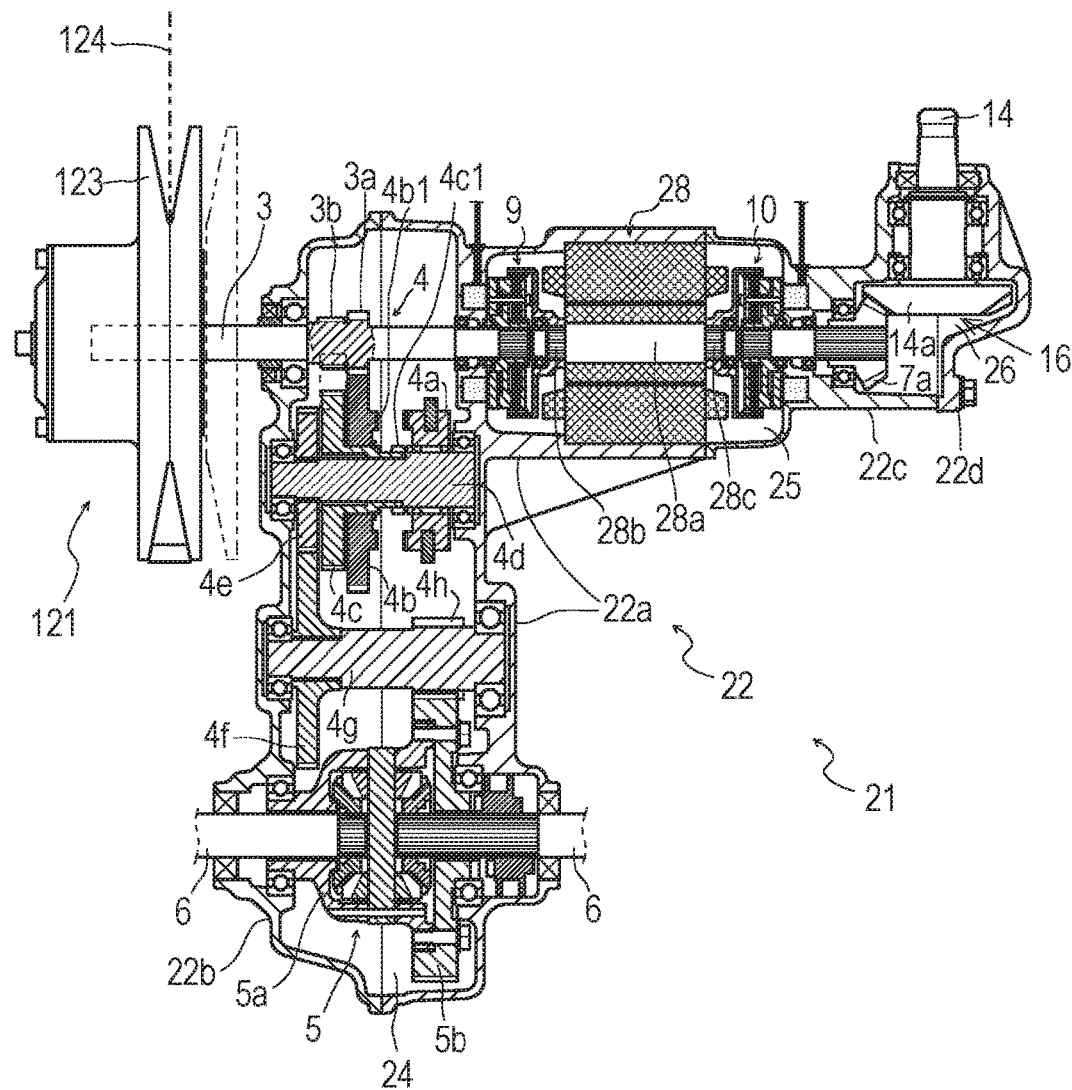
FIG. 10 is a sectional plan view of the transaxle according to the second embodiment.
Figure 11:
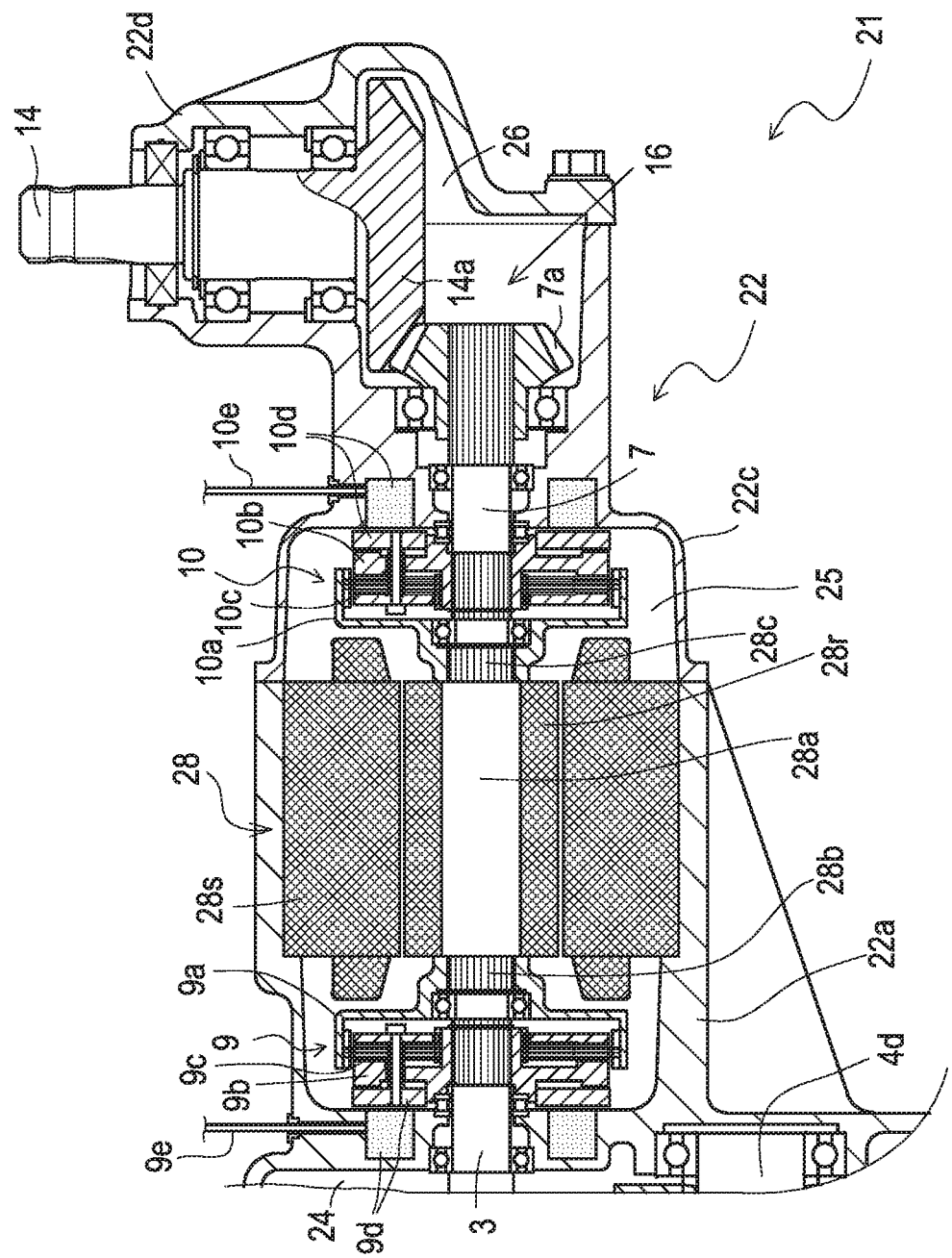
FIG. 11 is a fragmentary sectional plan view of a portion of the transaxle according to the second embodiment, incorporating a motor and first and second clutches.

Transaxle 21 (or 21A) shown in FIG. 9 to 11 (or 13) will be compared with transaxle 1 (or 1A) shown in FIG. 3 to 5 (or 7) in advantages regarding arrangement of its electric motor and first and second clutches 9 and 10.

In motor-and-clutch assembly 40 installed in rear transaxle casing 22 of transaxle 21 or motor unit 50 of transaxle 21A, motor 28 is disposed between first and second clutches 9 and 10, so that motor shaft 28a serving as the rotary axis of motor 28 is disposed coaxially to input shaft 3 (or 3A) and second output shaft 7 and has left and right motor output end portions 28b and 28c fixed to left and right clutch drums 9a and 10b, respectively, thereby also serving as a power distribution member for distributing the motor power between clutch drums 9a and 10a of first and second clutches 9 and 10, similar to distribution gear 13 of motor gear train 15 in motor-and-clutch assembly 20. Therefore, transaxle 21 (or 21A) is advantageous in reducing the number of component members such as to reduce costs because no gear train such as motor gear train 15 is needed to drivingly connect motor 28 to first and second clutches 9 and 10.

Further, due to the arrangement of motor 28 between first and second clutches 9 and 10 coaxial to input shaft 3 (or 3A) and second output shaft 7, the right portion of main housing 22a and motor housing 22c defining motor-and-clutch chamber 25 (or motor housing 22g defining motor-and-clutch chamber 25A) are minimized in the radial direction of input shaft 3 (or 3A) and second output shaft 7, thereby reducing costs for manufacturing rear transaxle casing 22 (or 22A).

Further, such a minimization of the housing defining motor-and-clutch chamber 25 (or 25A) is advantageous to expand a free space around the housing. For example, if rear transaxle casing 22 (or 22A) is arranged so as to extend rear wheel driving gear chamber 24 (or 24A) in the fore-and-aft direction of UTV 100 so that first output shafts 6 are disposed rearward from input shaft 3 (or 3A), transaxle 21 (or 21A) has a large free space along the right end of rear wheel driving gear chamber 24 (or 24A) and rearward from motor-and-clutch chamber 25 (or 25A). Such a large free space can be used for arranging various implements around transaxle 21 (or 21A).

On the contrary, transaxle 1 (or 1A) is advantageous in reducing its width in the lateral direction of UTV 100. In this regard, the axis of motor 8, i.e., motor shaft 8a, is offset from the axis of first and second clutches 9 and 10 coaxial to input shaft 3 (or 3A) and second output shaft 7. Therefore, transaxle 1 (or 1A) has a gap between input shaft 3 (or 3A) and second input shaft 7, which is narrowed in the lateral direction of UTV 100 because only distribution gear 13 is disposed between first and second clutches 9 and 10, in comparison with transaxle 21 (or 21A) having motor 28 disposed between first and second clutches 9 and 10.

Such a minimization of transaxle 1 (or 1A) in the lateral direction of UTV 100 contributes to minimization of entire UTV 100 in the lateral direction thereof or expansion of a free space rightward or leftward from transaxle 1 (or 1A) in UTV 100 for arranging implements around transaxle 1 (or 1A).

Motor-and-clutch assembly 20 installed in rear transaxle casing 2 of transaxle 1 or motor unit 30 of transaxle 1A may include an alternative drive train interposed between motor output end portion 8b of motor shaft 8a and first and second clutches 9 and 10, instead of motor gear train 15, only if the drive train drivingly connects first and second clutches 9 and 10 to motor shaft 8a of motor 8 axially offset from input shaft 3 and second output shaft 7.

For example, the alternative drive train may include pulleys and a belt looped over the pulleys, or may include sprockets and a chain looped over the sprockets. In such a case, one pulley or sprocket may be fixed on motor output end portion 8b, and another pulley or sprocket may be disposed between first and second clutches 9 and 10 coaxially to input shaft 3 and second output shaft 7 so as to be fixed to left and right clutch drums 9a and 10a. Therefore, the pulley or sprocket between first and second clutches 9 and 10 serves as a power distribution member that distributes the motor power between clutch drums 9a and 10b of first and second clutches 9 and 10, similar to distribution gear 13.

Drive modes of UTV 100 equipped with transaxle 1 as representative of transaxles 1, 1A, 21 and 21A will be described with reference to FIGS. 14 to 20.

A drive mode selection switch 170 is disposed at a portion of UTV 100 close to driver's seat 102 (see FIG. 1). Drive mode selectin switch 170 is electrically connected to ECU 180. By turning or rotating drive mode selection switch 170, one of drive modes is selected, and an input signal corresponding to the selected drive mode is inputted to ECU 180.

ECU 180 is electrically connected to engine 120, motor 8, first clutch 9 and second clutch 10. As mentioned above, first and second clutches 9 and 10 are electrically connected to ECU 180 via respective wires 9e and 10e. Therefore, ECU 180 outputs command signals about on/off operation of engine 120 and motor 8 and engagement/disengagement operation of first and second clutches 9 and 10 based on the drive mode selection.

Information about the drive modes is stored in a memory of ECU 180. The information about the drive mode means information about decision of whether each of engine 120, motor 8, first clutch 9 and second clutch 10 is turned on or off (or is engaged or disengaged) depending on which drive mode is selected.

Figures 14, 15:
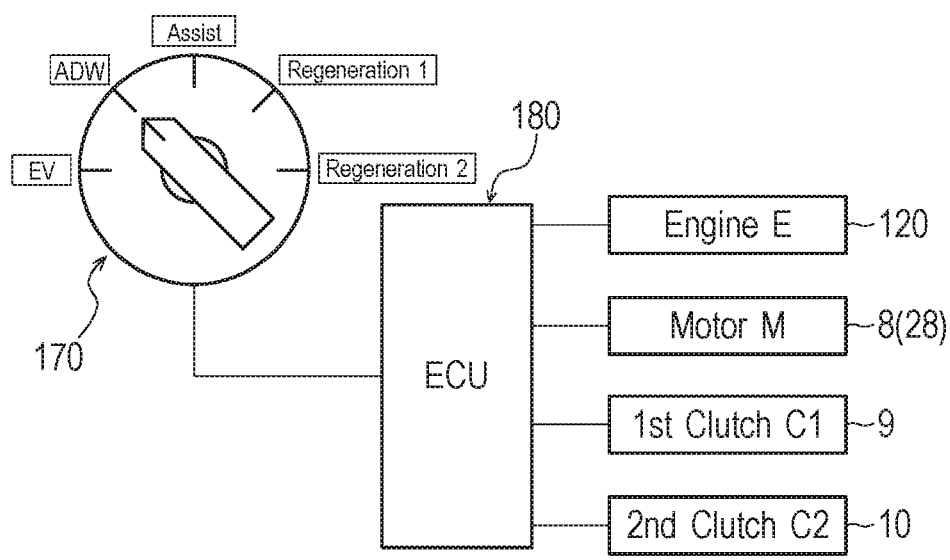
FIG. 14 is a block diagram of a drive mode selection system.
FIG. 15 is a table indicating control of an engine, the motor and the first and second clutches according to selection of drive mode.

FIGS. 14 to 20 are adapted on an assumption that engine 120, motor 8 (or 28), first clutch 9, second clutch 10, front wheels 104 and rear wheels 105 are referred to as engine E, motor M, first clutch C1, second clutch C2, front wheels F, rear wheels R, respectively. Further, FIG. 15 is adapted on an assumption that on-and-off operation of each of engine 120 and motor 8 (or 28) and engagement-and-disengagement of each of first and second clutches 9 and 10 are referred to as "ON" and "OFF". Hereinafter, the drive mode selection system will be described on the same assumption.

Referring to FIG. 14, when drive mode selection switch 170 is set at "AWD" (All Wheel Drive) position, UTV 100 is set in an AWD mode such that UTV 100 travels by driving all drive wheels F and R. This drive mode is appropriate to off-road travel of UTV 100 on wildernesses, uneven grounds, muddy places, and so on, because such an off-road travel requires high torque of drive wheels F and R.

To realize the AWD mode, referring to FIG. 15, engine E and motor M are turned on (set in "ON"), first clutch C1 is disengaged (set in "OFF"), and second clutch C2 is engaged (set in "ON").

Figure 16:
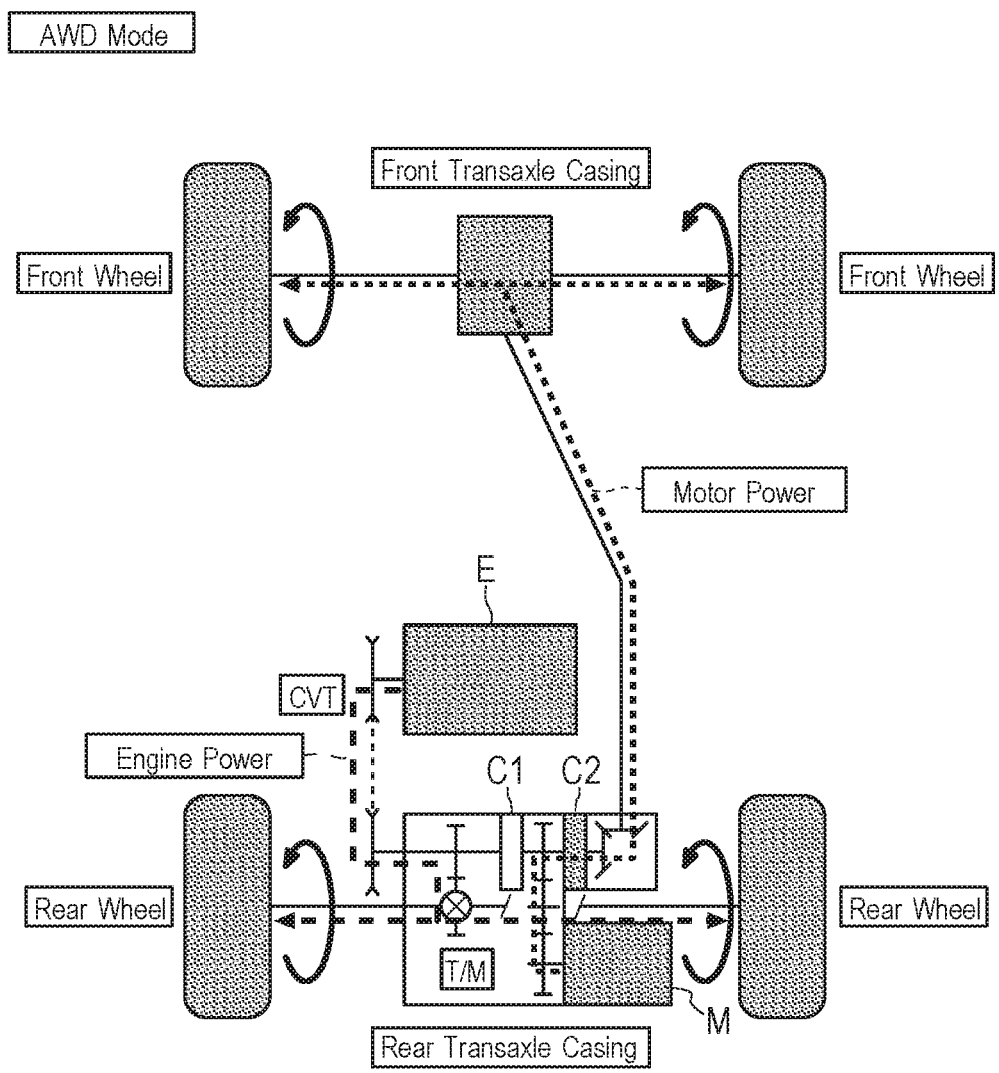
FIG. 16 is a diagram of the hybrid vehicle showing power flow in an AWD mode.

Therefore, referring to FIG. 16, due to the turn-on of engine E and the disengagement of first clutch C1, first output shafts 6 does not receive the motor power from motor M but receives the engine power from engine E via CVT 121, input shaft 3 (or 3A), reverser gear transmission 4 and differential gear unit 5, thereby driving rear wheels R by the engine power. In the meanwhile, due to the turn-on of motor M, the disengagement of first clutch C1, and the engagement of second clutch C2, second output shaft 7 does not receive the engine power from engine E via input shaft 3 (or 3A) but receives the motor power from motor M (via motor gear train 15 in transaxle 1 or 1A), thereby driving front wheels F by the motor power.

In this regard, ECU 180 controls the rotary speed of motor M in correspondence to a detected rotary speed of rear wheels R, thereby diminishing a rotary speed difference between front wheels F driven by the motor power and rear wheels R driven by the engine power.

Preferably, during the engagement of second clutch C2 in the AWD mode, the on/off operation of motor M is ondemand-controlled so that motor M is turned off to make front wheels F free from any driving power except that motor M is turned on to drive front wheels F by the motor power only if a rotary speed reduction or stopping of rear wheels R meaning that rear wheel R is (or rear wheels R are) stuck is detected. Therefore, consumption of electric power from battery 190 is reduced so as to prolong the life of battery 190.

Referring to FIG. 14, when drive mode selection switch 170 is set at "EV" (Electric Vehicle) position, UTV 100 is set in an EV mode such that UTV 100 travels by only the motor power from motor M, i.e., UTV 100 functions as an electric vehicle. For example, for hunting, UTV 100 needs to travel silently at a low speed. The EV mode is appropriate to such a silent and slow travel of UTV 100, which does not require a great driving power.

To realize the EV mode, referring to FIG. 15, engine E is turned off (set in "OFF"), motor M is turned on (set in "ON"), first clutch C1 is disengaged (set in "OFF"), and second clutch C2 is engaged (set in "ON").

Figure 17:
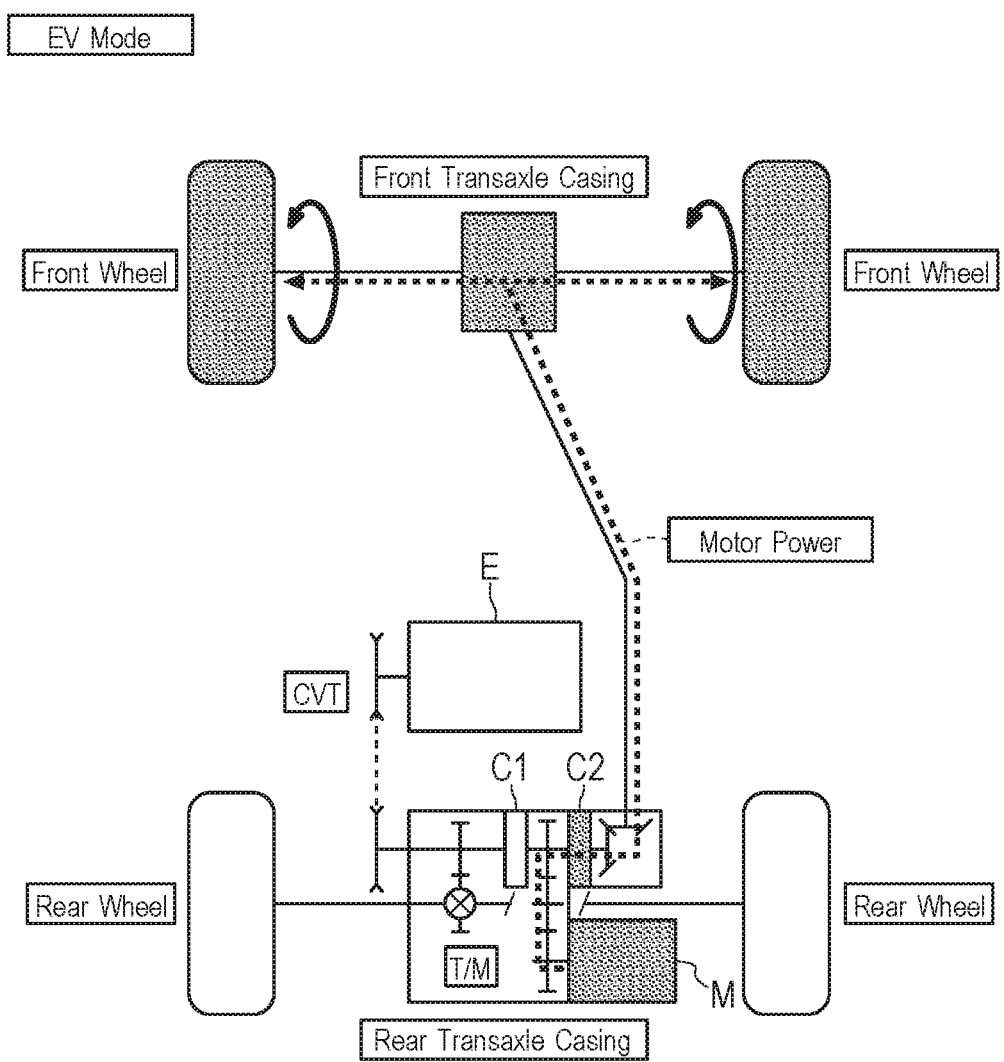
FIG. 17 is a diagram of the hybrid vehicle showing power flow in an EV mode.

Therefore, referring to FIG. 17, due to the turn-off of engine E and the disengagement of first clutch C1, first output shafts 6 receives neither the engine power from engine E nor the motor power from motor M, thereby transmitting no driving power to rear wheels R. In the meanwhile, due to the turn-on of motor M and the engagement of second clutch C2, second output shaft 7 receives the motor power from motor M (via motor gear train 15 in transaxle 1 or 1A), thereby driving front wheels F by the motor power. Since the engine power is not used, no fuel for driving engine E is consumed.

Referring to FIG. 14, when drive mode selection switch 170 is set at "Assist" position, UTV 100 is set in an assist mode such that UTV 100 travels with the engine power from engine E assisted by the motor power from motor M in driving rear wheels R. This drive mode is appropriate to high-power traction travel of UTV 100 or starting acceleration of UTV 100. Especially, this drive mode effects to solve a delayed acceleration because of the speed-shift performance of CVT 121.

To realize the assist mode, referring to FIG. 15, engine E and motor M are turned on (set in "ON"), first clutch C1 is engaged (set in "ON"), and second clutch C2 is disengaged (set in "OFF").

Figure 18:
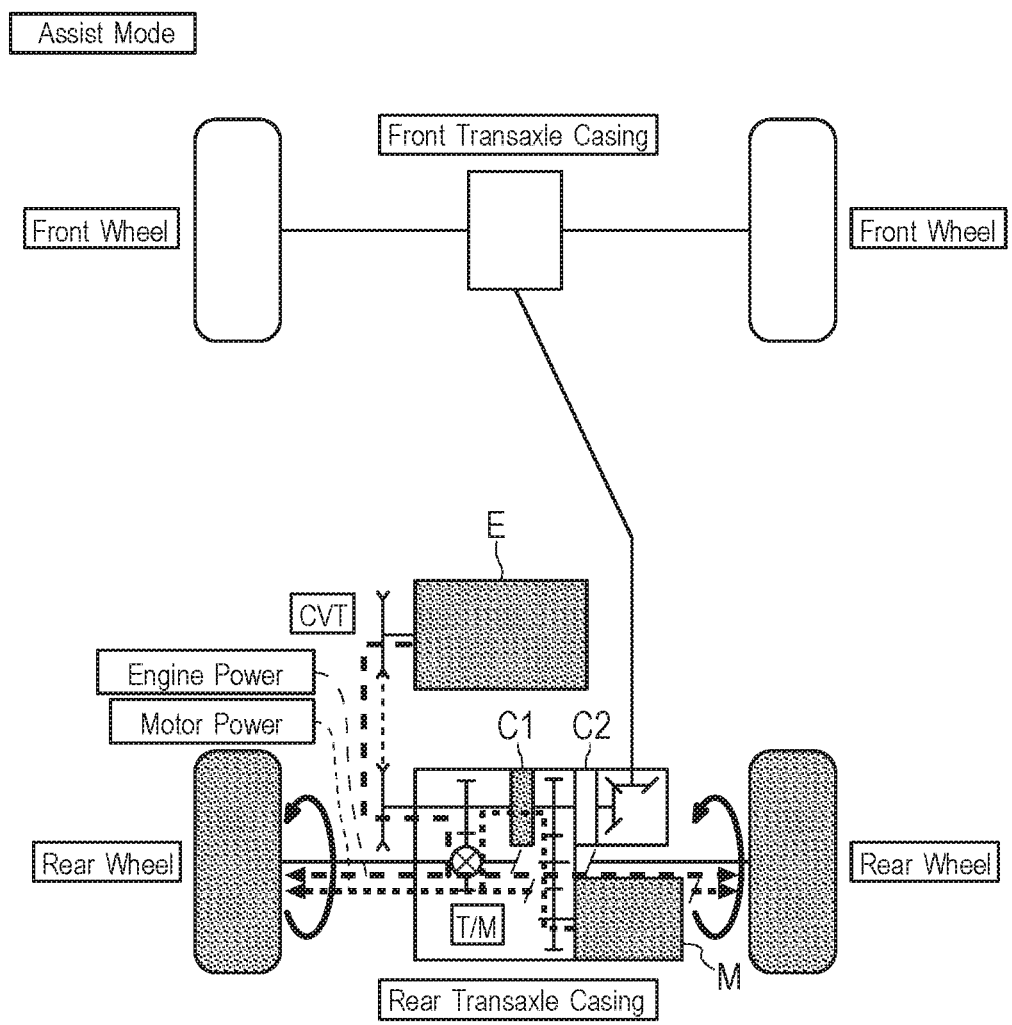
FIG. 18 is a diagram of the hybrid vehicle showing power flow in an Assist mode.

Therefore, referring to FIG. 18, due to the turn-on of engine E and motor M and the engagement of first clutch C1, first output shafts 6 receives both the engine power from engine E and the motor power from motor M via input shaft 3 (or 3A), reverser gear transmission 4 and differential gear unit 5, thereby driving rear wheels R by the engine power and the motor power. In the meanwhile, due to the disengagement of second clutch C2, second output shaft 7 receives neither the engine power nor the motor power, thereby leaving front wheels F free from a driving power. Therefore, the great driving power as combination of the engine power and the motor power is concentrated to rear wheels R so as to generate a high traction force of rear wheels R.

To output a sufficient power for starting UTV 100, CVT 121 requires a rotary speed of engine E (i.e., engine output shaft 120a) more than a certain value, thereby delaying start of UTV 100. However, by setting UTV 100 in the assist mode, due to the power assistance by motor M, first output shafts 6 can receive the sufficient driving power even when the rotary speed of engine E is low. Therefore, UTV 100 set in the assist mode can be started and accelerated without delay.

Referring to FIG. 14, when drive mode selection switch 170 is set at "Regeneration 1" position, UTV 100 is set in a first regeneration mode such that UTV 100 travels by driving only rear wheels R with the engine power from engine E while motor M is rotated by the engine power from engine E so as to regenerate electric power.

To realize the first regeneration mode, referring to FIG. 15, engine E is turned on (set in "ON"), motor M is turned off (set in "OFF"), first clutch C1 is engaged (set in "ON"), and second clutch C2 is disengaged (set in "OFF").

Figure 19:
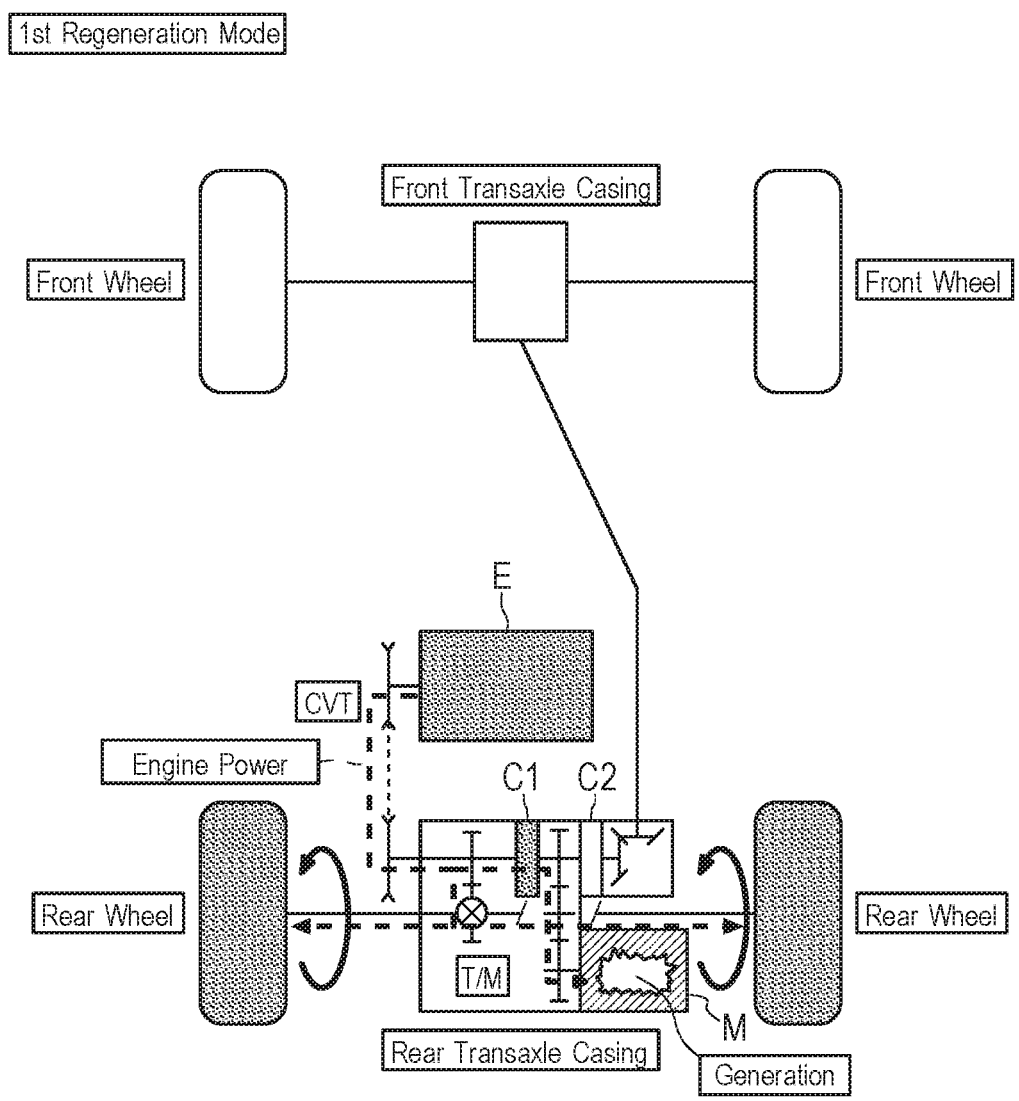
FIG. 19 is a diagram of the hybrid vehicle showing power flow in a First Regeneration mode.

Therefore, referring to FIG. 19, due to the turn-on of engine E and the engagement of first clutch C1, first output shafts 6 receives the engine power from engine E, and the engine power from engine E is transmitted to turned-off motor M via input shaft 3 (or 3A) and first clutch C1 (and motor gear train 15 in transaxle 1 or 1A), thereby rotating motor M to function as a generator. The electric power regenerated by motor M is reserved in battery 190 so as to recover the capacity of battery 190 for enabling long-time and long-distance travel of UTV 100.

Referring to FIG. 14, when drive mode selection switch 170 is set at "Regeneration 2" position, UTV 100 is set in a second regeneration mode such that UTV 100 travels by driving only rear wheels R with the engine power from engine E while motor M is rotated by a rotation force of front wheels F so as to regenerate electric power.

To realize the second regeneration mode, referring to FIG. 15, engine E is turned on (set in "ON"), motor M is turned off (set in "OFF"), first clutch C1 is disengaged (set in "OFF"), and second clutch C2 is engaged (set in "ON").

Figure 20:
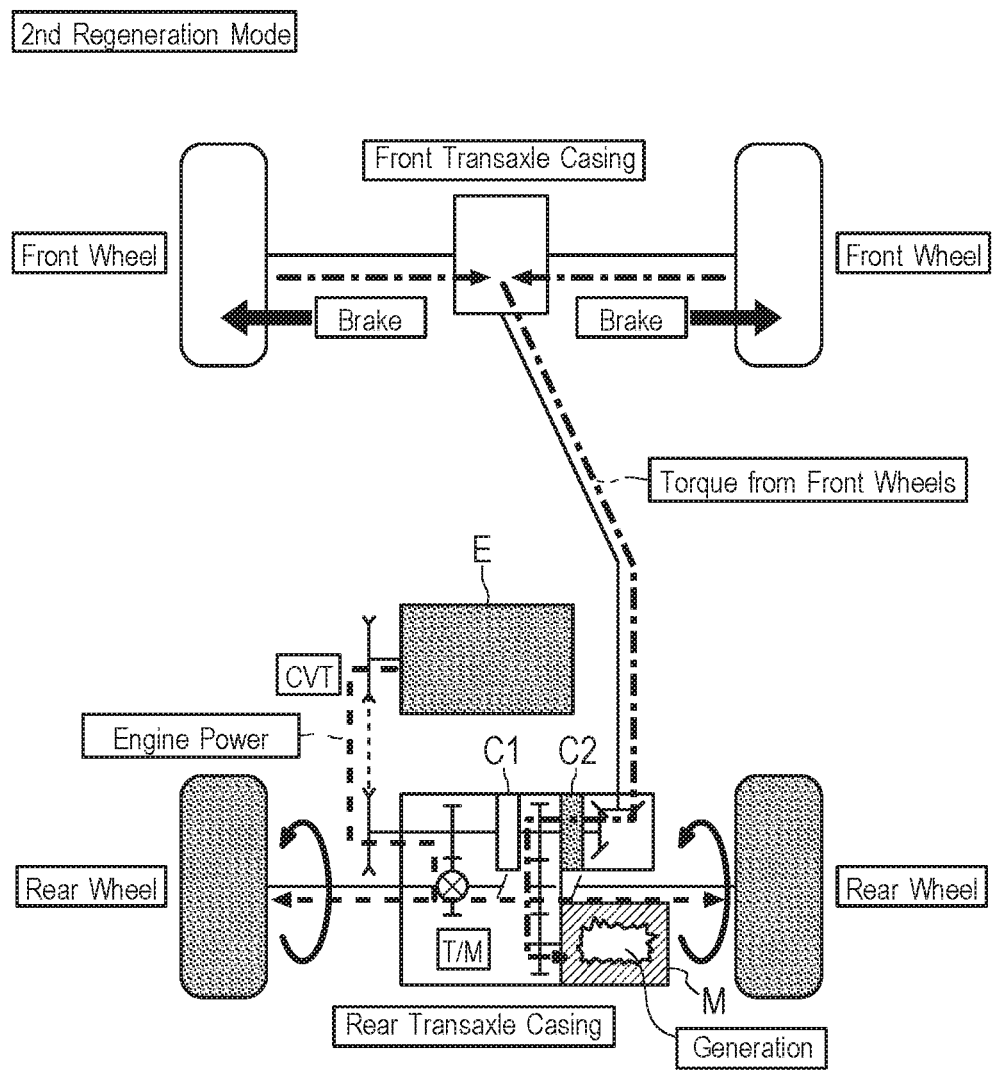
FIG. 20 is a diagram of the hydraulic vehicle showing power flow in a Second Regeneration mode.

Therefore, referring to FIG. 20, due to the turn-on of engine E, first output shafts 6 receives the engine power from engine E. Due to the disengagement of first clutch C1 and the turn-off of motor M, second output shaft 7 receives neither the engine power nor the motor power. Therefore, during travel of UTV 100, rotation of front wheels F does not depend on a driving power from PTO shaft 14 but depends on rotation of rear wheels R driven by the engine power.

However, due to the engagement of second clutch C2, the rotation of front wheels F generates a rotary force that backflows to turned-off motor M, so that motor M functions as a regenerator that converts the backflowing rotary force to electric energy. The regeneration action of motor M functions as a rotational resistance so as to prevent front wheels F from unexpectedly increasing their rotary speed.

Therefore, the second regeneration mode is convenient for UTV 100 when descending a slope. The braking performance of UTV 100 by applying the regeneration brake from motor M to front wheels F is substantially equal to that by applying an engine brake from engine E to front wheels F.

It is further understood by those skilled in the art that the foregoing description is given to preferred embodiments of the disclosed apparatus and that various changes and modifications may be made in the invention without departing from the scope thereof defined by the following claims.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A transaxle for a hybrid vehicle, comprising:
   a motor configured to output a motor power;
   an input shaft having first and second ends axially opposite each other, the first end of the input shaft being structured to receive an engine power from an engine of the hybrid vehicle, and the second end of the input shaft being structured to receive the motor power from the motor;
   a first output shaft driven by power outputted from the input shaft so as to drive a first drive wheel of the hybrid vehicle;
   a second output shaft driven by the motor power from the motor so as to drive a second drive wheel of the hybrid vehicle, the second output shaft extended coaxially to the input shaft; and
   a first clutch interposed between the motor and the input shaft; and
   a second clutch interposed between the motor and the second output shaft,
   wherein the first clutch and the second clutch are coaxially disposed between the second end of the input shaft and an axial end of the second output shaft.

2. The transaxle for a hybrid vehicle according to claim 1,
   wherein the motor comprises a motor shaft serving as a rotary axis of the motor, the motor shaft being axially offset from the input shaft and the second output shaft, and
   wherein the transaxle further comprises:
   a drive train interposed between the motor shaft and the first and second clutches, the drive train comprising a power distribution member disposed between the first and second clutches, the first clutch being interposed between the second end of the input shaft and the distribution gear, and the second clutch being interposed between the distribution gear and the axial end of the second output shaft.

3. The transaxle for a hybrid vehicle according to claim 1, wherein the motor comprises a motor shaft serving as a rotary axis of the motor, the motor shaft comprising axially opposite end portions serving as first and second motor output end portions for outputting the motor power, and
wherein the motor is disposed between the first and second clutches so that the motor shaft is extended coaxially to the input shaft and the second output shaft, the first clutch being interposed between the second end of the input shaft and the first motor output end portion of the motor shaft, and the second clutch being interposed between the second motor output end portion of the motor shaft and the axial end of the second output shaft.

4. The transaxle for a hybrid vehicle according to claim 1, further comprising:
a transmission interposed between the input shaft and the first output shaft; and
a transaxle casing comprising first and second housings,
wherein the first housing incorporates the input shaft, the transmission and the first output shaft,
wherein the motor and the first and second clutches are assembled as a motor-and-clutch assembly,
wherein the second housing incorporates the entire motor-and-clutch assembly and the second output shaft, so that the second housing, the motor-and-clutch assembly, and the second output shaft are assembled as a motor unit, and
wherein the transaxle comprising the motor unit is configured such that the motor unit is detachable from the first housing of the transaxle casing by detaching the second housing from the first housing and by separating the first clutch from the input shaft in the first housing.

5. The transaxle for a hybrid vehicle according to claim 4, wherein the motor comprises a motor shaft axially offset from the second output shaft, and
wherein the motor-and-clutch assembly comprises a drive train interposed between the motor shaft and the first and second clutches so as to transmit the motor power from the motor to the first and second clutches.

6. The transaxle for a hybrid vehicle according to claim 4, wherein, in the motor-and-clutch assembly, the motor is disposed between the first and second clutches,
wherein the motor comprises a motor shaft disposed coaxially to the second output shaft, the motor shaft having axially opposite ends drivingly connected to the first and second clutches, respectively.

7. The transaxle for a hybrid vehicle according to claim 1, wherein the motor and the first and second clutches are operatively connected to a controller and a drive mode selection device provided in the hybrid vehicle, and
wherein the controller is configured such that, when a drive mode for the hybrid vehicle is selected by the drive mode selection device, the controller controls on/off operation of the engine in the hydraulic vehicle and the motor in the transaxle and engagement/disengagement operation of the first and second clutches in the transaxle so as to realize the selected drive mode.

8. The transaxle for a hybrid vehicle according to claim 7, wherein the controller is configured such that the engine and the motor are turned on, the first clutch is disengaged, and the second clutch is engaged, when the selected drive mode is to make the hybrid vehicle travel with the first drive wheel driven by the engine power from the engine and with the second drive wheel driven by the motor power from the motor.

9. The transaxle for a hybrid vehicle according to claim 7, wherein the controller is configured such that the engine is turned off, the motor is turned on, the first clutch is disengaged, and the second clutch is engaged, when the selected drive mode is to make the hybrid vehicle travel with the second drive wheel driven by the motor power from the motor.

10. The transaxle for a hybrid vehicle according to claim 7, wherein the controller is configured such that the engine and the motor are turned on, the first clutch is engaged, and the second clutch is disengaged, when the selected drive mode is to make the hybrid vehicle travel with the first drive wheel driven by the engine power from the engine and the motor power from the motor.

11. The transaxle for a hybrid vehicle according to claim 7, wherein the controller is configured such that the engine is turned on, the motor is turned off, the first clutch is engaged, and the second clutch is disengaged, when the selected drive mode is to make the hybrid vehicle travel with the first drive wheel driven by the engine power from the engine while the motor is rotated by the engine power to generate electric power.

12. The transaxle for a hybrid vehicle according to claim 7, wherein the controller is configured such that the engine is turned on, the motor is turned off, the first clutch is disengaged, and the second clutch is engaged, when the selected drive mode is to make the hybrid vehicle travel with the first drive wheel driven by the engine power from the engine while the motor is rotated by a rotary force of the second drive wheel to generate electric power.

13. A motor unit comprising:
a motor configured to output a motor power;
first and second drive members coaxial to each other;
first and second clutches disposed between the first and second drive member; and
a power distribution member disposed between the first and second clutches so as to be driven by the motor power,
wherein the first clutch is interposed between the first drive member and the power distribution member,
wherein the second clutch is interposed between the second drive member and the power distribution member,
wherein the motor, the power distribution member and the first and second clutches are assembled as a motor-and-clutch assembly, and
wherein the motor unit further comprises a housing incorporating the entire motor-and-clutch assembly.

14. The motor unit according to claim 13,
wherein the motor comprises a motor shaft serving as a rotary axis of the motor, the motor shaft being axially offset from the first and second drive members, and
wherein the motor unit comprises a drive train interposed between the motor shaft and the first and second clutches, the drive train comprising the power distribution member disposed between the first and second clutches.

15. The motor unit according to claim 14, further comprising:
- wherein the motor, the drive train and the first and second clutches are assembled as a motor-and-clutch assembly, and
- wherein the motor unit further comprises a housing incorporating the entire motor-and-clutch assembly.

16. A motor unit comprising:
- a motor configured to output a motor power;
- first and second drive members coaxial to each other;
- first and second clutches disposed between the first and second drive member; and
- a power distribution member disposed between the first and second clutches so as to be driven by the motor power,
- wherein the motor comprises a motor shaft serving as a rotary axis of the motor, and
- wherein the motor is disposed between the first and second clutches so that the motor shaft is disposed coaxially to the first and second drive members so as to serve as the power distribution member.

17. The motor unit according to claim 16, further comprising:
- wherein the motor and the first and second clutches are assembled as a motor-and-clutch assembly, and
- wherein the motor unit further comprises a housing incorporating the entire motor-and-clutch assembly.

* * * * *